United States Patent
Inomata et al.

(10) Patent No.: US 10,341,397 B2
(45) Date of Patent: Jul. 2, 2019

(54) NON-TRANSITORY COMPUTER READABLE MEDIUM, INFORMATION PROCESSING APPARATUS, AND INFORMATION PROCESSING SYSTEM FOR RECORDING MINUTES INFORMATION

(71) Applicant: FUJI XEROX CO., LTD., Tokyo (JP)

(72) Inventors: Kohshiro Inomata, Kanagawa (JP); Masayuki Yamaguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 170 days.

(21) Appl. No.: 15/040,517

(22) Filed: Feb. 10, 2016

(65) Prior Publication Data
US 2017/0046659 A1    Feb. 16, 2017

(30) Foreign Application Priority Data

Aug. 12, 2015  (JP) .................. 2015-159611
Aug. 17, 2015  (JP) .................. 2015-160486
Sep. 7, 2015   (JP) .................. 2015-175948

(51) Int. Cl.

| | |
|---|---|
| H04L 29/06 | (2006.01) |
| H04L 12/18 | (2006.01) |
| H04M 3/56 | (2006.01) |
| G06F 3/14 | (2006.01) |
| G06Q 10/10 | (2012.01) |
| H04M 3/42 | (2006.01) |

(52) U.S. Cl.
CPC .......... *H04L 65/403* (2013.01); *G06F 3/1454* (2013.01); *G06Q 10/10* (2013.01); *H04L 12/1818* (2013.01); *H04L 12/1831* (2013.01); *H04L 65/4015* (2013.01); *H04M 3/42221* (2013.01); *H04M 3/567* (2013.01); *H04L 65/1083* (2013.01); *H04M 2203/301* (2013.01); *H04M 2203/305* (2013.01); *H04M 2203/558* (2013.01)

(58) Field of Classification Search
CPC .............. H04L 65/403; H04L 65/4015; H04L 65/1083; H04L 12/1818; H04L 12/1831; G06F 3/1454; G06Q 10/10; H04M 3/567
See application file for complete search history.

(56) References Cited

U.S. PATENT DOCUMENTS

| | | | |
|---|---|---|---|
| 6,119,147 A | 9/2000 | Toomey et al. | |
| 6,343,313 B1 * | 1/2002 | Salesky ................. | G06F 3/1415 709/204 |

(Continued)

FOREIGN PATENT DOCUMENTS

| | | | |
|---|---|---|---|
| JP | 200050226 A | 2/2000 | |
| JP | 200592715 A | 4/2005 | |

(Continued)

OTHER PUBLICATIONS

Dec. 23, 2016 extended Search Report issued in European Patent Application No. 16160147.1.

(Continued)

*Primary Examiner* — Blake J Rubin
(74) *Attorney, Agent, or Firm* — Oliff PLC

(57) ABSTRACT

A non-transitory computer readable medium, storing a program causing a computer to execute a process for causing at least portions off display screens of plural terminals connected to each other through a network to display information in a synchronous manner, includes receiving material information indicating information regarding a material to be displayed, receiving operation information indicating details of operations that users perform on the respective terminals, and recording minutes information in which the material information, the operation information, and time information indicating times at which the users perform the operations are associated with each other.

10 Claims, 23 Drawing Sheets

(56) References Cited

U.S. PATENT DOCUMENTS

| | | | |
|---|---|---|---|
| 7,490,169 B1* | 2/2009 | Ogdon | H04L 12/1813 709/205 |
| 8,806,354 B1* | 8/2014 | Hyndman | G06F 3/04883 709/204 |
| 8,887,067 B2* | 11/2014 | Tripathi | H04L 12/1831 715/730 |
| 9,106,794 B2* | 8/2015 | Jones | H04L 12/1831 |
| 9,344,546 B2* | 5/2016 | Choudhary | H04L 51/00 |
| 9,514,444 B2* | 12/2016 | Moyers | G06F 3/0481 |
| 9,661,270 B2* | 5/2017 | Gottlieb | H04N 7/15 |
| 9,756,091 B1* | 9/2017 | Davies | H04L 65/4015 |
| 2004/0064322 A1* | 4/2004 | Georgiopoulos | G10L 15/26 704/277 |
| 2004/0125932 A1* | 7/2004 | Orbach | H04M 3/42127 379/202.01 |
| 2005/0050061 A1* | 3/2005 | Karstens | G06F 16/2358 |
| 2005/0228861 A1 | 10/2005 | Nagayama et al. | |
| 2006/0112325 A1* | 5/2006 | Ducheneaut | H04L 12/1822 715/203 |
| 2006/0224430 A1* | 10/2006 | Butt | G06Q 10/06311 705/7.16 |
| 2006/0282548 A1 | 12/2006 | Yoshida et al. | |
| 2007/0266325 A1* | 11/2007 | Helm | G06Q 10/10 715/733 |
| 2008/0008458 A1* | 1/2008 | Gudipaty | G11B 27/034 386/240 |
| 2008/0263010 A1* | 10/2008 | Roychoudhuri | G06F 17/30056 |
| 2009/0129295 A1* | 5/2009 | Shibata | H04M 3/56 370/260 |
| 2009/0138332 A1* | 5/2009 | Kanevsky | G06Q 30/0201 705/7.29 |
| 2009/0327425 A1* | 12/2009 | Gudipaty | H04N 7/147 709/205 |
| 2010/0005142 A1* | 1/2010 | Xiao | G06Q 10/10 709/204 |
| 2010/0064010 A1* | 3/2010 | Alkov | G09B 5/06 709/206 |
| 2010/0251177 A1* | 9/2010 | Geppert | G06F 3/04817 715/821 |
| 2011/0044212 A1* | 2/2011 | Tani | H04M 7/0042 370/260 |
| 2011/0117886 A1* | 5/2011 | Travis | H04M 3/42221 455/412.2 |
| 2011/0125560 A1* | 5/2011 | Cocheu | G06Q 10/10 705/14.4 |
| 2011/0282653 A1* | 11/2011 | Tamura | G06F 17/2775 704/9 |
| 2012/0001917 A1* | 1/2012 | Doganata | G06Q 10/00 345/440 |
| 2012/0050296 A1* | 3/2012 | Kurosawa | H04L 12/1831 345/467 |
| 2012/0150863 A1* | 6/2012 | Fish | G06Q 10/101 707/741 |
| 2012/0166952 A1* | 6/2012 | Alexandrov | G06Q 10/101 715/730 |
| 2012/0296914 A1* | 11/2012 | Romanov | G11B 27/034 707/741 |
| 2013/0024772 A1* | 1/2013 | Delia | G06Q 10/00 715/730 |
| 2013/0070045 A1* | 3/2013 | Meek | G06Q 10/06 348/14.07 |
| 2013/0103446 A1* | 4/2013 | Bragdon | G06Q 10/1095 705/7.15 |
| 2013/0106985 A1* | 5/2013 | Tandon | H04L 12/1827 348/14.08 |
| 2013/0132138 A1* | 5/2013 | Doganata | G06Q 10/06 705/7.11 |
| 2013/0258042 A1* | 10/2013 | Shun | H04L 67/22 348/14.08 |
| 2013/0290872 A1* | 10/2013 | Hong | H04L 65/403 715/753 |
| 2013/0339431 A1* | 12/2013 | Yannakopoulos | H04L 12/1827 709/204 |
| 2014/0074909 A1* | 3/2014 | Gunderson | H04L 12/1822 709/203 |
| 2014/0129945 A1* | 5/2014 | Bhogal | G06F 3/01 715/732 |
| 2014/0150059 A1* | 5/2014 | Uchida | H04L 63/08 726/3 |
| 2014/0168354 A1* | 6/2014 | Clavel | H04N 7/152 348/14.09 |
| 2014/0198174 A1* | 7/2014 | Sanso | H04N 7/15 348/14.08 |
| 2014/0212107 A1* | 7/2014 | Saint-Jean | G11B 27/031 386/241 |
| 2014/0253671 A1* | 9/2014 | Bentley | H04N 7/15 348/14.08 |
| 2014/0282089 A1* | 9/2014 | West | H04L 65/403 715/753 |
| 2014/0344360 A1* | 11/2014 | Bank | H04L 65/403 709/204 |
| 2015/0052440 A1* | 2/2015 | Livingston | G06F 3/04845 715/732 |
| 2015/0097922 A1* | 4/2015 | Le Devehat | H04L 65/1069 348/14.08 |
| 2015/0134722 A1* | 5/2015 | Marshall | H04L 67/42 709/203 |
| 2015/0149929 A1* | 5/2015 | Shepherd | H04L 65/403 715/753 |
| 2015/0181020 A1* | 6/2015 | Fitzsimmons | H04M 3/42221 379/67.1 |
| 2015/0288924 A1* | 10/2015 | Liu | H04L 12/1822 348/14.08 |
| 2015/0295964 A1* | 10/2015 | Probolsky | H04L 65/4038 709/204 |
| 2015/0341399 A1* | 11/2015 | Lee | H04L 65/403 715/255 |
| 2015/0341401 A1* | 11/2015 | Lee | H04L 65/403 715/753 |
| 2015/0356312 A1* | 12/2015 | Sato | G06Q 10/109 726/28 |
| 2016/0050260 A1* | 2/2016 | Trinh | H04L 67/10 709/201 |
| 2016/0073054 A1* | 3/2016 | Balasaygun | H04N 7/15 348/14.08 |
| 2016/0132607 A1* | 5/2016 | Skatell | G06F 17/30867 707/734 |
| 2016/0165056 A1* | 6/2016 | Bargetzi | G06Q 10/1095 455/416 |
| 2016/0170968 A1* | 6/2016 | Allen | G06F 17/2765 434/322 |
| 2016/0179456 A1* | 6/2016 | Sivakeesar | G06F 3/1454 715/727 |
| 2016/0197871 A1* | 7/2016 | Bender | H04L 51/32 709/206 |
| 2016/0285929 A1* | 9/2016 | Oganezov | H04L 65/403 |
| 2016/0337213 A1* | 11/2016 | Deutsch | H04L 43/045 |
| 2016/0343351 A1* | 11/2016 | Chen | G09G 5/14 |
| 2016/0352912 A1* | 12/2016 | Dhawan | H04W 4/08 |

FOREIGN PATENT DOCUMENTS

| | | |
|---|---|---|
| JP | 2005-244524 A | 9/2005 |
| JP | 2006331309 A | 12/2006 |

OTHER PUBLICATIONS

Oct. 18, 2017 Search Report issued in European Patent Application No. 16160147.1.

Apr. 9, 2019 Office Action issued in Japanese Patent Application No. 2015-160486.

* cited by examiner

FIG. 6

| TYPE NUMBER | OPERATION DETAILS | OPERATION TYPE |
|---|---|---|
| 1 | DISPLAY NEW METERIAL | "DISPLAY MATERIAL" |
| 2 | WRITE IN MATERIAL USING PEN TOOL | "PEN" |
| 3 | PICK UP SUBMITTED COMMENT, CREATE SUBMISSION COMMENT | "PICK UP" |
| 4 | SWITCH BETWEEN PAGES OF MATERIAL | "SWITCH BETWEEN PAGES" |
| 5 | INPUT AND MOVE MOUSE POINTER | "POINTER" |
| 6 | OTHER OPERATIONS | "NO OPERATION TYPE" |

FIG. 10

| MANAGEMENT NUMBER | TIME | TERMINAL IDENTIFICATION INFORMATION | PAGE | OPERATION TYPE | DATA |
|---|---|---|---|---|---|
| 1 | 2015/03/18 10:00:41 | 000001(master) | 1 | "SWITCH BETWEEN PAGES" | xxxxxxx (ex. PAGE 2) |
| 2 | 2015/03/18 10:01:00 | 000001(master) | 2 | "SOUND" | xxxxxxx (ex. SOUND DATA) |
| 3 | 2015/03/18 10:01:10 | 000005(slave) | 2 | "PEN" | xxxxxxx (ex. COORDINATES, WRITE DATA) |
| 4 | 2015/03/18 10:01:15 | 000003(slave) | 2 | "PICK UP" | xxxxxxx (ex. COORDINATES, WRITE DATA) |
| 5 | 2015/03/18 10:01:16 | 000005(slave) | 2 | "SWITCH BETWEEN PAGES" | xxxxxxx (ex. PAGE 3) |
| ‥ | ‥ | ‥ | ‥ | ‥ | ‥ |

FIG. 11

| MANAGEMENT NUMBER | TIME | TERMINAL IDENTIFICATION INFORMATION | PAGE | OPERATION TYPE | DATA |
|---|---|---|---|---|---|
| 1 | 2015/03/18 10:00:41 | 000001(master) | 1 | "SWITCH BETWEEN PAGES" | xxxxxxx (ex. PAGE 2) |
| 2 | 2015/03/18 10:00:50 | 000005(local) | 2 | "PEN" | xxxxxxx (ex. COORDINATES, WRITE DATA) |
| 3 | 2015/03/18 10:01:00 | 000001(master) | 2 | "SOUND" | xxxxxxx (ex. SOUND DATA) |
| 4 | 2015/03/18 10:01:10 | 000005(slave) | 2 | "PEN" | xxxxxxx (ex. COORDINATES, WRITE DATA) |
| 5 | 2015/03/18 10:01:15 | 000003(slave) | 2 | "PICK UP" | xxxxxxx (ex. COORDINATES, WRITE DATA) |
| 6 | 2015/03/18 10:01:16 | 000005(slave) | 2 | "SWITCH BETWEEN PAGES" | xxxxxxx (ex. PAGE 3) |
| .. | .. | .. | .. | .. | .. |

FIG. 13

| TYPE NUMBER | OPERATION DETAILS | OPERATION TYPE | PRIORITY |
|---|---|---|---|
| 1 | DISPLAY NEW MATERIAL | "DISPLAY MATERIAL" | 5 |
| 2 | WRITE IN MATERIAL USING PEN TOOL | "PEN" | 4 |
| 3 | PICK UP SUMITTED COMMENT, CREATE SUBMISSION COMMENT | "PICK UP" | 3 |
| 4 | SWITCH BETWEEN PAGES OF MATERIAL | "SWITCH BETWEEN PAGES" | 2 |
| 5 | INPUT AND MOVE MOUSE POINTER | "POINTER" | 1 |
| 6 | OTHER OPERATIONS | "NO OPERATION TYPE" | 0 |

FIG. 14

| TYPE NUMBER | OPERATION DETAILS | OPERATION TYPE | PRESENTER PRIORITY | PARTICIPANT PRIORITY |
|---|---|---|---|---|
| 1 | DISPLAY NEW MATERIAL | "DISPLAY MATERIAL" | 5 | 5 |
| 2 | WRITE IN MATERIAL USING PEN TOOL | "PEN" | 4 | 2 |
| 3 | PICK UP SUBMITTED COMMENT, CREATE SUBMISSION COMMENT | "PICK UP" | 3 | 3 |
| 4 | SWITCH BETWEEN PAGES OF MATERIAL | "SWITCH BETWEEN PAGES" | 2 | 4 |
| 5 | INPUT AND MOVE MOUSE POINTER | "POINTER" | 1 | 1 |
| 6 | OTHER OPERATIONS | "NO OPERATION TYPE" | 0 | 0 |

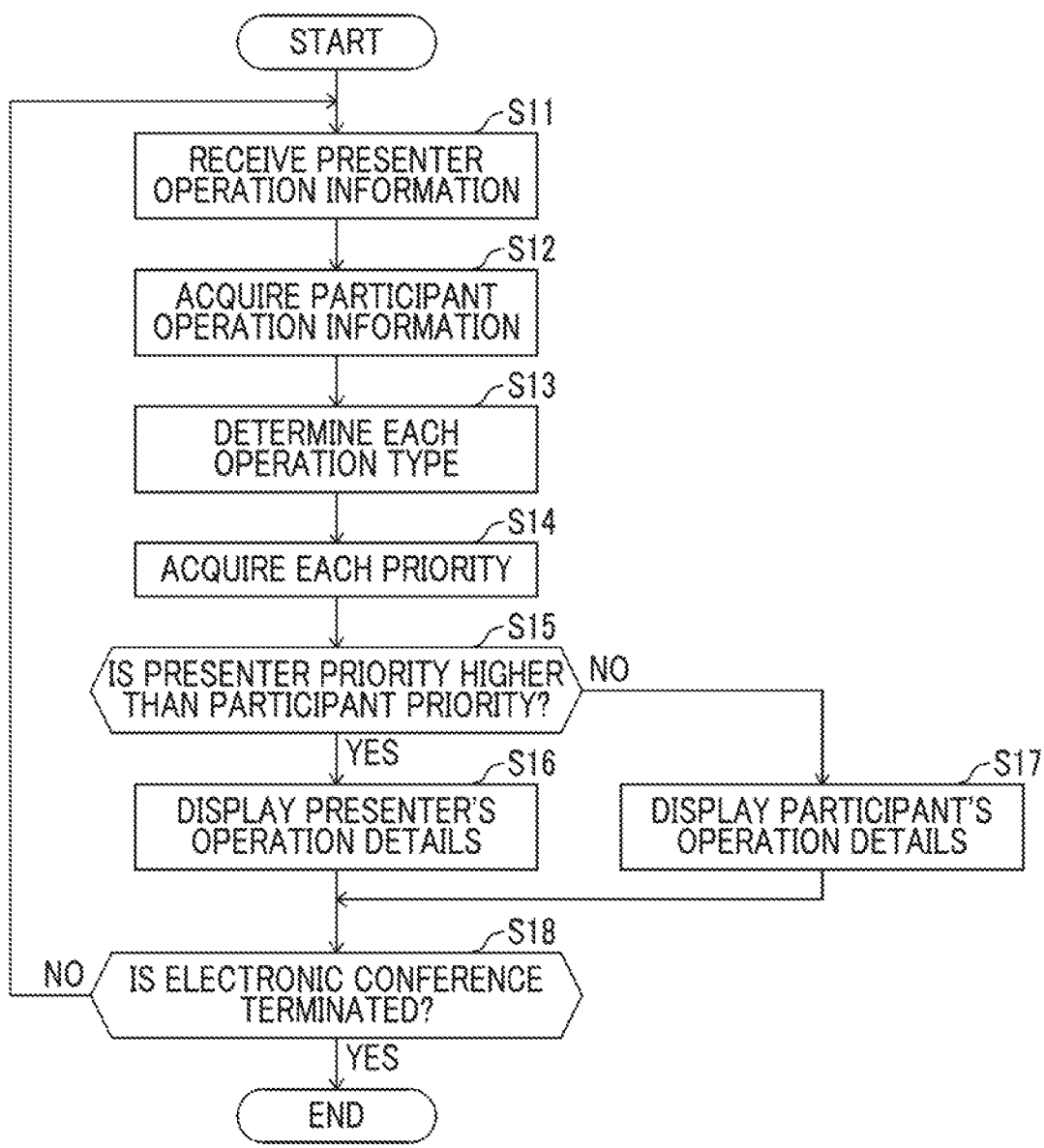

FIG. 17

| PRIORITY | TERMINAL IDENTIFICATION INFORMATION | OPERATION DETAILS |
|---|---|---|
| 1 | 000010(LOCAL TERMINAL) | "SWITCH BETWEEN PAGES" |
| 2 | 000001(master) | "SOUND" |
| 3 | 000005(slaveA) | "PEN" |
| 4 | 000003(slaveB) | "PICK UP" |
| 5 | 000005(slaveA) | "SWITCH BETWEEN PAGES" |
| ⋮ | ⋮ | ⋮ |

FIG. 18

| PRIORITY | TERMINAL IDENTIFICATION INFORMATION | OPERATION DETAILS |
|---|---|---|
| 1 | 000010(CURRENT LOCAL TERMINAL) | "SWITCH BETWEEN PAGES" |
| 2 | 000010(PAST LOCAL TERMINAL) | "SWITCH BETWEEN PAGES" |
| 3 | 000001(master) | "SOUND" |
| 4 | 000005(slaveA) | "PEN" |
| 5 | 000003(slaveB) | "PICK UP" |
| 6 | 000005(slaveA) | "SWITCH BETWEEN PAGES" |
| ⋮ | ⋮ | ⋮ |

NON-TRANSITORY COMPUTER READABLE MEDIUM, INFORMATION PROCESSING APPARATUS, AND INFORMATION PROCESSING SYSTEM FOR RECORDING MINUTES INFORMATION

CROSS-REFERENCE TO RELATED APPLICATIONS

This application is based on and claims priority under 35 USC 119 from Japanese Patent Application No. 2015-160486 filed Aug. 17, 2015, Japanese Patent Application No. 2015-175948 filed Sep. 7, 2015, and Japanese Patent Application No. 2015-159611 filed Aug. 12, 2015.

BACKGROUND (i) Technical Field

The present invention relates to a non-transitory computer readable medium, an information processing apparatus, and an information processing system, and.

(ii) Related Art

In recent years, so-called electronic conference systems, in which a PC, a tablet terminal, and the like are connected to each other through a network to electronically share materials, sound, video data, and the like, have been used. In such an electronic conference system, there has been proposed a technique for recording multimedia information (multimedia data) such as sound exchanged during a conference or a video obtained by capturing the state of the conference, for the purpose of mainly creating minutes of the conference, and the like. However, the recording of the intact multimedia data may result in that the amount of data of the minutes becomes huge.

SUMMARY

According to an aspect of the invention, a non-transitory computer readable medium, storing a program causing a computer to execute a process for causing at least portions of display screens of plural terminals connected to each other through a network to display information in a synchronous manner, includes receiving material information indicating information regarding a material to be displayed, receiving operation information indicating details of operations that users perform on the respective terminals, and recording minutes information in which the material information, the operation information, and time information indicating times at which the users perform the operations are associated with each other.

BRIEF DESCRIPTION OP THE DRAWINGS

Exemplary embodiments of the present invention will be described in detail based on the following figures, wherein:

FIG. 6 is a diagram illustrating an example of an operation type table;

FIG. 10 is a diagram illustrating an example of an operation information management table;

FIG. 11 is a diagram illustrating an example of an updated operation information management table;

FIG. 13 is a diagram illustrating an example of an operation type table;

FIG. 14 is a diagram illustrating an example of the operation type table;

FIG. 15 is a flow chart illustrating the operation of the electronic conference system according to Modification Example 5;

FIG. 17 is a diagram illustrating an example of a priority determination table;

FIG. 18 is a diagram illustrating another example of the priority determination table;

DETAILED DESCRIPTION

Hereinafter, an exemplary embodiment of the present invention will be described with reference to the accompanying drawings. In the exemplary embodiment, an electronic conference system that shares electronic data between plural operation terminals connected to each other through a network will be described as an example of an information processing system.

Figure 1:
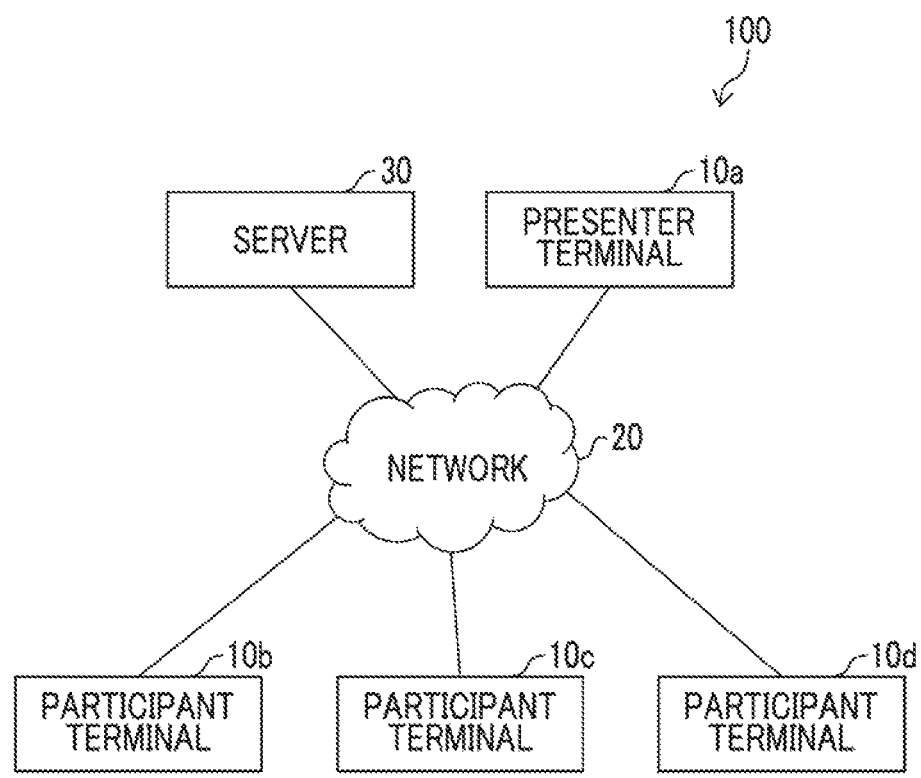
FIG. 1 is a configuration diagram illustrating the entire electronic conference system according to an exemplary embodiment.

FIG. 1 is a configuration diagram illustrating the entire electronic conference system according to the exemplary embodiment. An electronic conference system 100 (information processing system) is configured to include plural operation terminals 10 that are used by plural users attending a conference. In the exemplary embodiment, for convenience of description, a user such as a conference promoter, a conference facilitator, or a person taking charge of presentation during a conference who may take a principal role in the conference is called a "presenter" (second user), and an operation terminal used by the presenter is called a "presenter terminal" (second operation terminal). In addition, a user attending the conference, except for the presenter, is called a "participant" (first user), and an operation terminal used by the participant is called a "participant terminal" (first operation terminal). In FIG. 1, one presenter terminal 10a and three participant terminals 10b, 10c, and 10d are illustrated. In addition, hereinafter, when components common to the presenter terminal 10a and the participant terminals 10b, 10c, and 10d are described, the terminals will be collectively referred to as an operation terminal 10.

As illustrated in FIG. 1, the presenter terminal 10a and the participant terminals 10b, 10c, and 10d are connected to each other through a communication network 20 such as a local area network (LAN) or the Internet.

Figure 2:
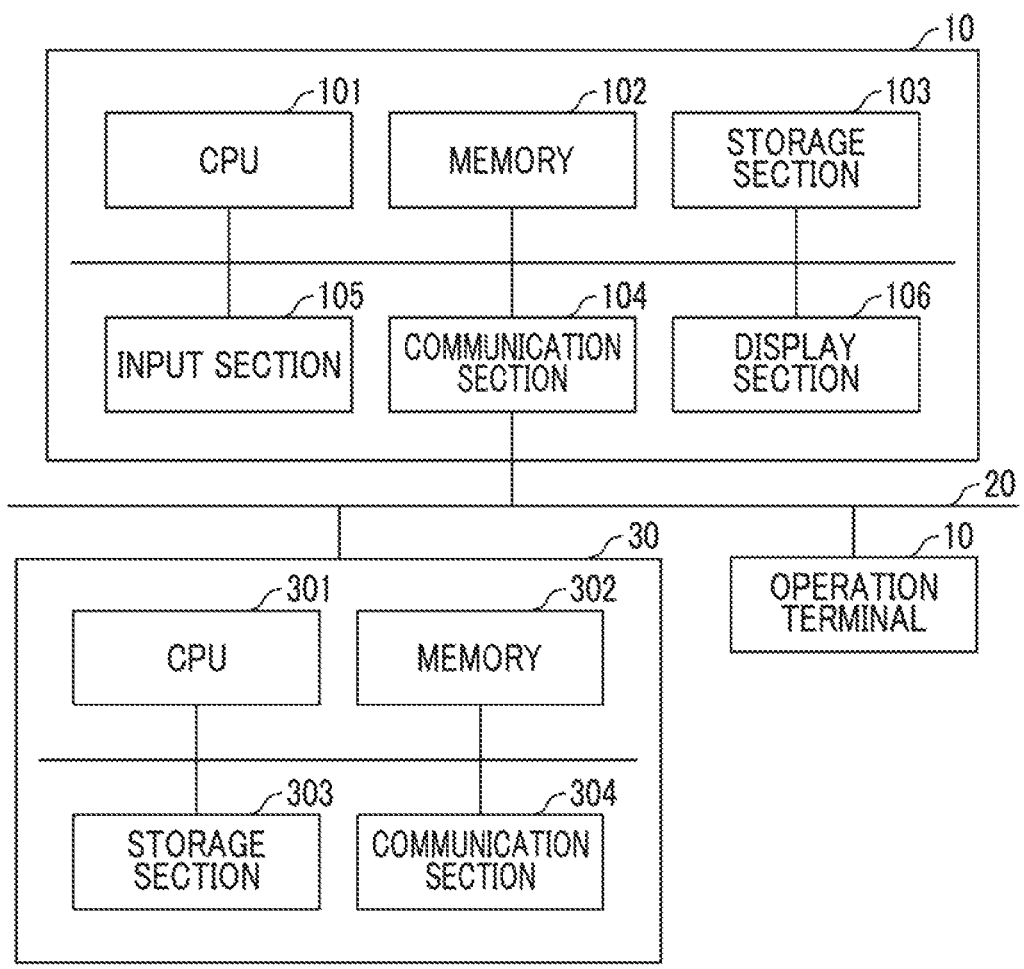
FIG. 2 is a block diagram illustrating a hardware configuration of an operation terminal.

FIG. 2 is a block diagram illustrating a hardware configuration of the operation terminal 10. The operation terminal 10 is configured with a computer including a CPU 101, a memory 102, a storage section 103, a communication section 104, an input section 105, and a display section 106. These hardware elements are connected to each other by a bus so as to send and receive data to and from each other. The CPU 101 controls each section of the operation terminal 10, and executes various pieces of information processing. The memory 102 stores various types of programs and data. A work area of the CPU 101 is also secured in the memory 102. The storage section 103 stores data such as various types of files or documents. The communication section 104 performs data communication with other operation terminals 10 through the communication network 20. The input section 105 is an input device such as a keyboard, a mouse, a pen tool, or a touch panel. The display section 106 is a display screen that displays various types of files and documents through application software such as a Web browser. The storage section 103, the input section 105, and the display section 106 may be provided outside the operation terminal 10, and may be connected to the operation terminal 10 through the communication network 20. In addition, software such as a browser or an e-mail client is incorporated into the operation terminal 10. The operation terminal 10 is a portable information terminal such as a personal computer, a personal digital assistant (PDA), or a smartphone.

A server 30 is configured with a computer including a CPU 301, a memory 302, a storage section 303, and a communication section 304. These hardware elements are connected to each other by a bus so as to send and receive data to and from each other. The CPU 301 controls each section of the server 30, and executes various pieces of information processing. The memory 302 stores various types of programs and data. A work area of the CPU 301 is also secured in the memory 302. The storage section 303 stores data such as various types of files or documents, and various pieces of information. Meanwhile, the communication section 304 performs data communication with other terminals and servers through the communication network 20. The storage section 303 may be provided outside the server 30, and may be connected to the server 30 through the communication network 20.

Hereinafter, a specific configuration of the electronic conference system 100 will be described focusing on the presenter terminal 10a and the participant terminal 10b.

Figure 3:
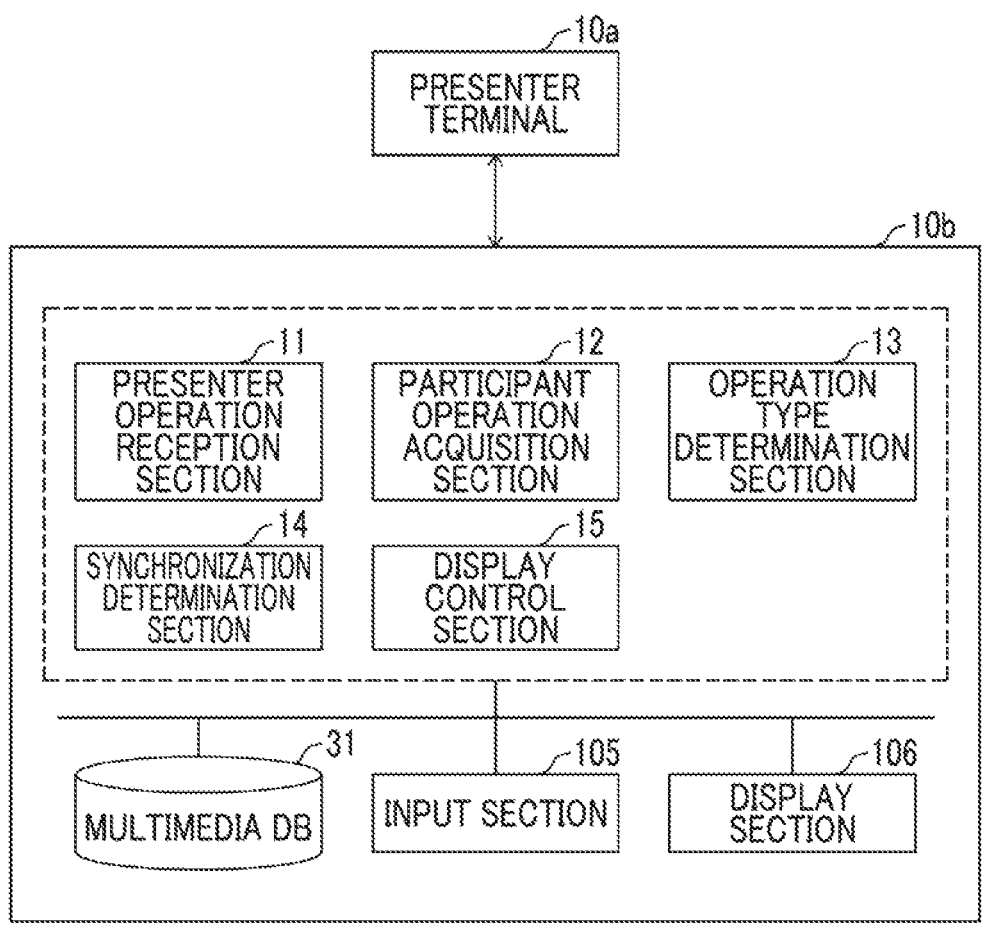
FIG. 3 is a functional block diagram illustrating a specific configuration of a participant terminal.

FIG. 3 is a functional block diagram illustrating a specific configuration of the participant terminal 10b. The participant terminal 10b includes a presenter, operation reception section 11, a participant operation acquisition section 12, an operation type determination section 13, a synchronization determination section 14, and a display control section 15. These elements are realized by the CPU 101 executing programs stored in the memory 102 (see FIG. 2). The storage section 103 stores a multimedia DB 31 that stores data (multimedia data) such as various types of files, documents, and sound.

The programs may be installed in the participant terminal 10b from a computer readable information storage medium such as a CD-ROM, a DVD-ROM, or a memory card, may be downloaded through the communication network 20 such as the Internet, or may be downloaded from a server in which the programs are stored in advance.

Figure 4:
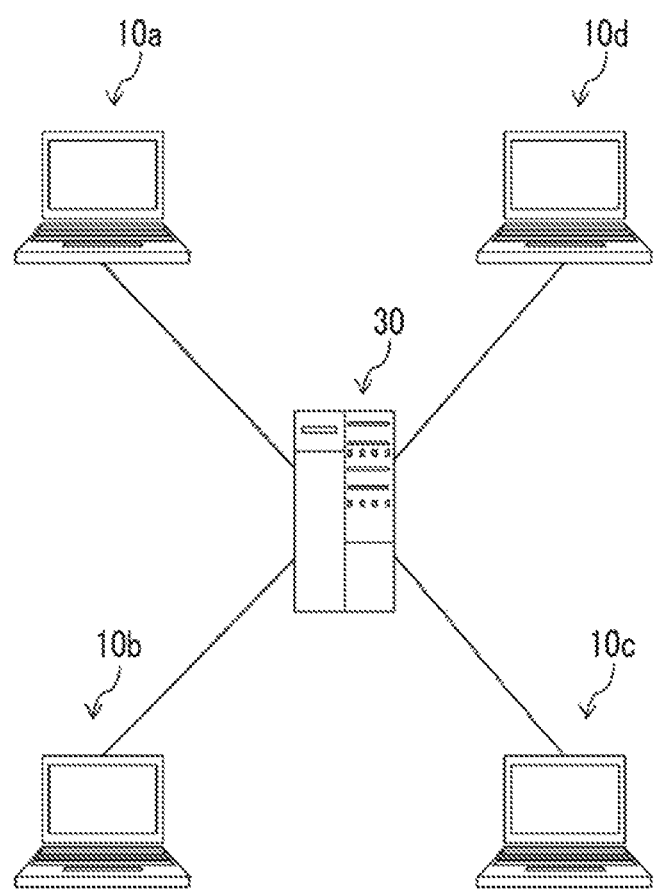
FIG. 4 is a diagram illustrating an example of a network configuration of the electronic conference system.

For example, as illustrated in FIG. 4, in a network configuration in which the operation terminals 10 are connected to each other by a network through the server 30, the programs may be downloaded to the memories 102 of the participant terminals 10b, 10c, and 10d from the server 30, and material data for a conference may be downloaded to the multimedia DB 31 at a point in time when the participant terminals 10b, 10c, and 10d are connected to the server 30. The programs and the material data may be constituted by, for example, JavaScript (registered trademark). In addition, a presenter performs predetermined setting by connecting the operation terminal 10 to the server 30, and thus, the operation terminal 10 is recognized as the presenter terminal 10a. A participant performs predetermined setting by connecting the operation terminal 10 to the server 30, and thus, the operation terminal 10 is recognized as the participant terminal 10b or the like. The server 30 transmits the programs and the material data to each of the operation terminals 10 recognized as participant terminals. Meanwhile, the server 30 may also transmit the programs and the material data to the operation terminal 10 recognized as a presenter terminal. The server 30 functions as a repeater that transmits the programs and the material data and then performs information communication between the presenter terminals 10a and the participant terminals 10b, 10c, and 10d. Meanwhile, the operation terminal 10 having the programs downloaded thereto or recorded therein functions as an information processing apparatus. In addition, a computer having the programs downloaded thereto may be the operation terminal 10 or may be the server 30.

Functions corresponding to the programs will be described.

The presenter operation reception section 11 receives information indicating details of an operation that a presenter performs on the presenter terminal 10a (hereinafter, referred to as presenter operation information) (second operation detail), from the presenter terminal 10a. The presenter operation information is information indicating operation details such as displaying a new material, writing in a material using a pen tool (handwriting tool), picking up (selecting) a submitted comment, switching pages of a material, inputting and mowing a mouse pointer, and inputting sound.

Figure 5:
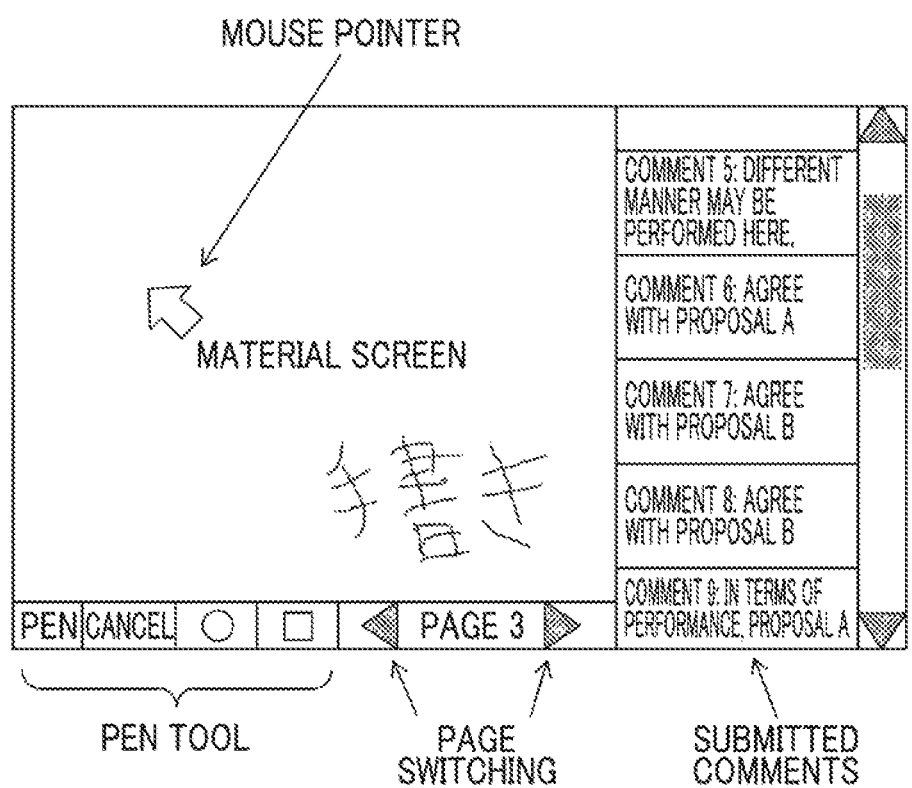
FIG. 5 illustrates an example of a display content displayed on a display screen of a presenter terminal.

Here, a specific example of a processing content in the presenter terminal 10a will be described. FIG. 5 illustrates an example of a display content displayed on a display screen of the presenter terminal 10a.

For example, when a presenter performs the read-out of a material (operation of displaying a new material on a material screen) which is stored in the multimedia DB 31 by operating a mouse or the like (input section 105) in the presenter terminal 10a, the presenter terminal 10a notifies the participant terminal 10b of presenter operation information indicating the operation details including information indicating a storage destination URL a material or a material ID (transmits the information) through the communication section 104.

In addition, for example, when a presenter inputs a mouse pointer to a material screen (see FIG. 5) displayed on the display section 105 by operating a mouse in the presenter terminal 10a, the presenter terminal 10a notifies the participant terminal 10b of pieces of presenter operation information indicating the operation details including the position (coordinates) of a mouse pointer, an ID and a page number of a material which is input, and the like through the communication section 104. Meanwhile, the presenter terminal 10a may sequentially transmit the pieces of presenter operation information at fixed intervals (for example, for every 50 msec).

In addition, for example, when a presenter writes a character and the like in the material screen (see FIG. 5) displayed on the display section 106 by operating a pen tool in the presenter terminal 10a, the presenter terminal 10a notifies the participant terminal 10b of pieces of presenter operation information indicating the operation details including the position (coordinates) of the written character, an ID and a page number of a material which is written, and the like through the communication section 104.

In addition, for example, when a presenter switches between pages of the material screen (see FIG. 5) displayed on the display section 106 by operating a mouse in the presenter terminal 10a, the presenter terminal 10a notifies the participant terminal 10b of presenter operation information indicating the operation details including information indicating an ID and a designated page number of a displayed material through the communication section 104.

In this manner, the presenter terminal 10a notifies the participant terminals 10b, 10c, and 10d of information indicating details of an operation that a presenter performs, based on the presenter's operation.

The participant operation acquisition section 12 acquires information indicating details of an operation that a participant performs on the participant terminal 10b (hereinafter, referred to as participant operation information) (first operation detail). Similarly to the presenter operation information, the participant operation information is information indicating operation details such as displaying a material, writing in a material using a pen tool, creating a submission comment, switching between pages of a material, inputting and moving a mouse pointer, and inputting sound.

The operation type determination section 13 determines an operation type (presenter operation type) based on the presenter operation information received by the presenter operation reception section 11 from the presenter terminal 10a. In addition, the operation type determination section 13 determines operation types (participant operation types) based on the participant operation information acquired by the participant operation acquisition section 12 in a local terminal (participant terminal 10b). The operation types are types obtained by classifying details of operations that a presenter and a participant perform, by types. The operation types are set in advance, and are stored in the storage section 103 as, for example, an operation type table. The operation details registered in the operation type table refer to certain operation details, for example, operation details for changing display contents (synchronization contents) displayed on the display section 106 of the participant terminal 10b in synchronization with the presenter terminal 10a. Specifically, the operation details refer to on operation of changing display contents of the participant terminal 10b by switching a first page of a material A displayed on the display section 106 of the presenter terminal 10a to a second page when the first page is synchronized and is displayed on the display section 106 of the participant terminal 10b, an operation of changing a display content of the participant terminal 10b by inputting a mouse pointer to a first page of a material A displayed on the display section 106 of the presenter terminal 10a when the first page is synchronized and is displayed on the display section 106 of the participant terminal 10b, and the like.

Meanwhile, in the participant terminal 10b, a synchronization content may be displayed on the entire display screen, or may be displayed on a portion of the display screen. In addition, the entire display screen of the presenter terminal 10a may be synchronized, or a portion of the display screen may be synchronized. For this reason, for example, even when a mouse pointer operated by a presenter in the presenter terminal 10a is synchronously operated in the participant terminal 10b (synchronization state), a mouse painter for the participant terminal 10b may be displayed separately (for example, outside the synchronized display screen). In addition, both the mouse pointer in a synchronization state which is operated by the presenter and the mouse pointer for the participant terminal 10b which is operated by the participant may be displayed within the synchronized display screen. An operation of inputting a mouse pointer in the presenter terminal 10a is included in an operation of changing the display content of the participant terminal 10b.

FIG. 6 illustrates an example of an operation type table. In the operation type table illustrated in FIG. 6, five operation types of "display material", "pen", "pick up", "switch between pages", and "pointer" which correspond to operation details. For example, the operation type determination section 13 specifies an operation type corresponding to a presenter's operation details with reference to the operation type table. In addition, the operation type determination section 13 specifies an operation type corresponding to a participant's operation details with reference to the operation type table. Meanwhile, when an operation type corresponding to operation details is not present, the operation type determination section 13 determines "no operation type". In addition, operation details registered in the operation type table are not limited to those illustrated in FIG. 6. For example, operation details and operation types for a presenter which are registered in the operation type table may be different from those for a participant. In this case, an operation type table for a presenter and an operation type table for a participant may be separately provided.

The synchronization determination section 14 determines whether to make the participant terminal 10b synchronous or asynchronous with the presenter terminal 10a based on a determination result of the operation type determination section 13. Specifically, when the presenter's operation details correspond to a predetermined operation type (see FIG. 6), the synchronization determination section 14 determines "synchronization". In addition, when the participant's operation details correspond to a predetermined operation type (see FIG. 6), the synchronization determination section 14 determines "asynchronization". Meanwhile, when the presenter's operation details or the participant's operation details are "no operation type", the synchronization determination section 14 determines "asynchronization".

The display control section 15 controls a display content of the display screen of the participant terminal 10b based on a determination result of the synchronization determination section 14. Specifically, when the synchronization determination section 14 determines "synchronization", the display control section 15 reflects a display content according to the presenter's operation details on the participant terminal 10b and displays the display content thereon. For example, when the presenter displays a new material A on the presenter terminal 10a, the synchronization determination section 14 determines "synchronization", and the display control section 15 displays the material A on the display section 106 of the participant terminal 10b. In addition, for example, when the presenter switches a display page of the material A from a first page to a second page in the presenter terminal 10a, the synchronization determination section 14 displays "synchronization", and the display control section 15 switches the display page of the material A displayed on the display section 106 of the participant terminal 10b from the first page to the second page. Similarly, when a character is written using a pen tool, a submitted comment is picked up, or the presenter moves a mouse pointer, the display control section 15 reflects the operation details on the participant terminal 10b.

On the other hand, when the synchronization determination section 14 determines "asynchronization", the display control section 15 sets the participant terminal 10b to be in an asynchronization state (asynchronization mode) with respect to the presenter terminal 10a, and reflects the participant's operation details on the participant terminal 10b. For example, when the participant selects a different material B in a case where a material A is displayed on the participant terminal 10b in synchronization with the presenter terminal 10a, the synchronization determination section 14 determines "asynchronization", and the display control section 15 sets the participant terminal 10b to be in a state which is asynchronous with the presenter terminal 10a, changes the display content of the participant terminal 10b, and displays the material B on the display section 106. In addition, for example, when the participant performs an operation of performing switching to the next page (fourth page) in a case where a third page of the material A is displayed on the participant terminal 10b in synchronization with the presenter terminal 10a, the synchronization determination section 14 determines "asynchronization", and the display control section 15 sets the participant terminal 10b to be in an asynchronization state with respect to the presenter terminal 10a and switches (changes) the display page of the material A displayed on the display section 106 of the participant terminal 10b from the third page to the fourth page. Similarly, when a character is written using a pen tool, a submission comment is created, or a participant moves a mouse pointer, the display control section 15 sets the participant terminal 10b to be in an asynchronization state with respect to the presenter terminal 10a, and reflects the operation details on the participant terminal 10b.

As described above, the display control section 15 functions as a synchronization releasing section that releases a synchronization state (performs switching to an asynchronization state) by a participant performing an operation which is set in advance in the participant terminal 10b, and functions as a synchronization section that performs return to a synchronization state again (releases an asynchronization state) by a presenter performing an operation which is set in advance in the presenter terminal 10a in a state where the (synchronization state is released (asynchronization state).

Figure 7:
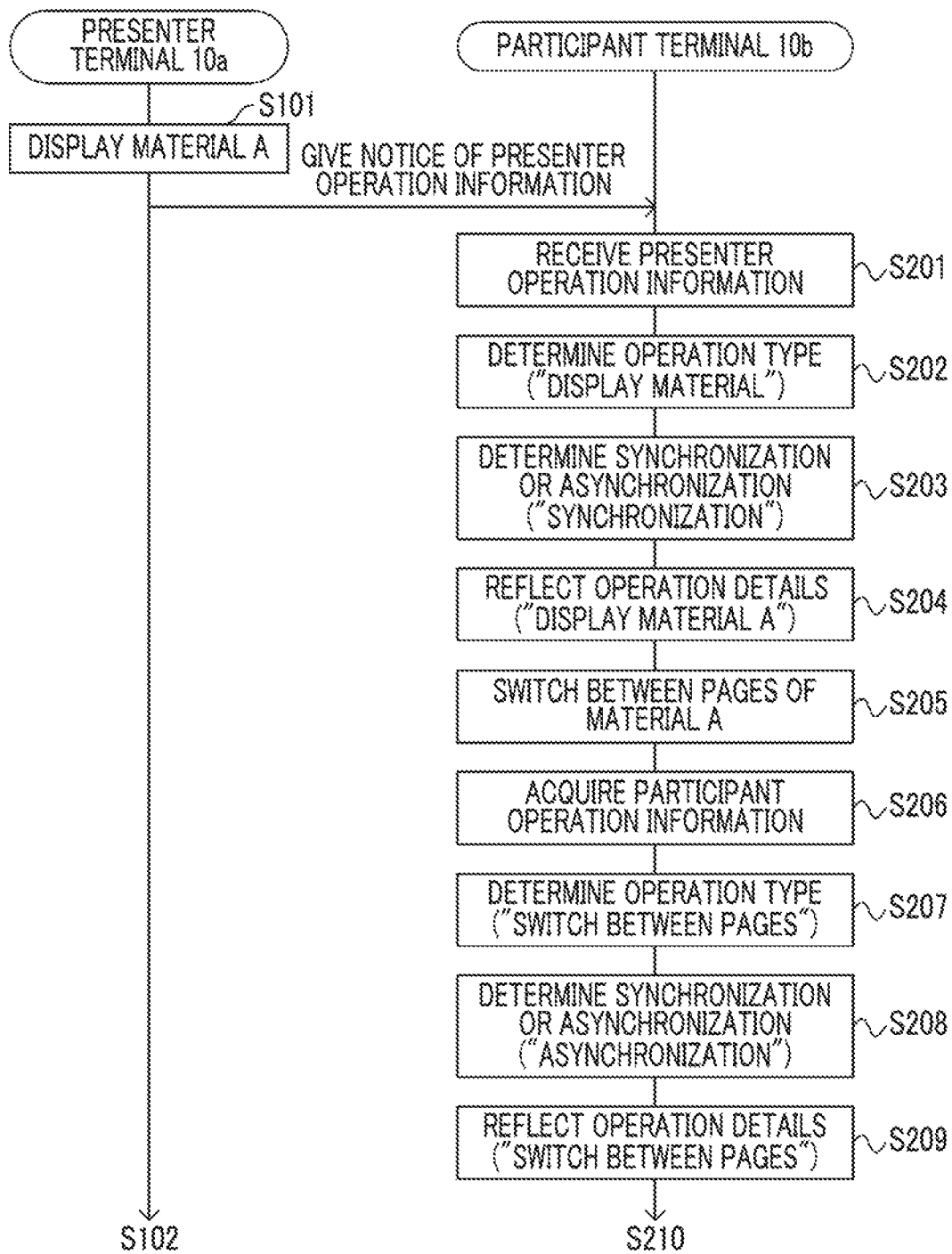
FIG. 7 is a flow chart illustrating the operation of the electronic conference system.
Figure 8:
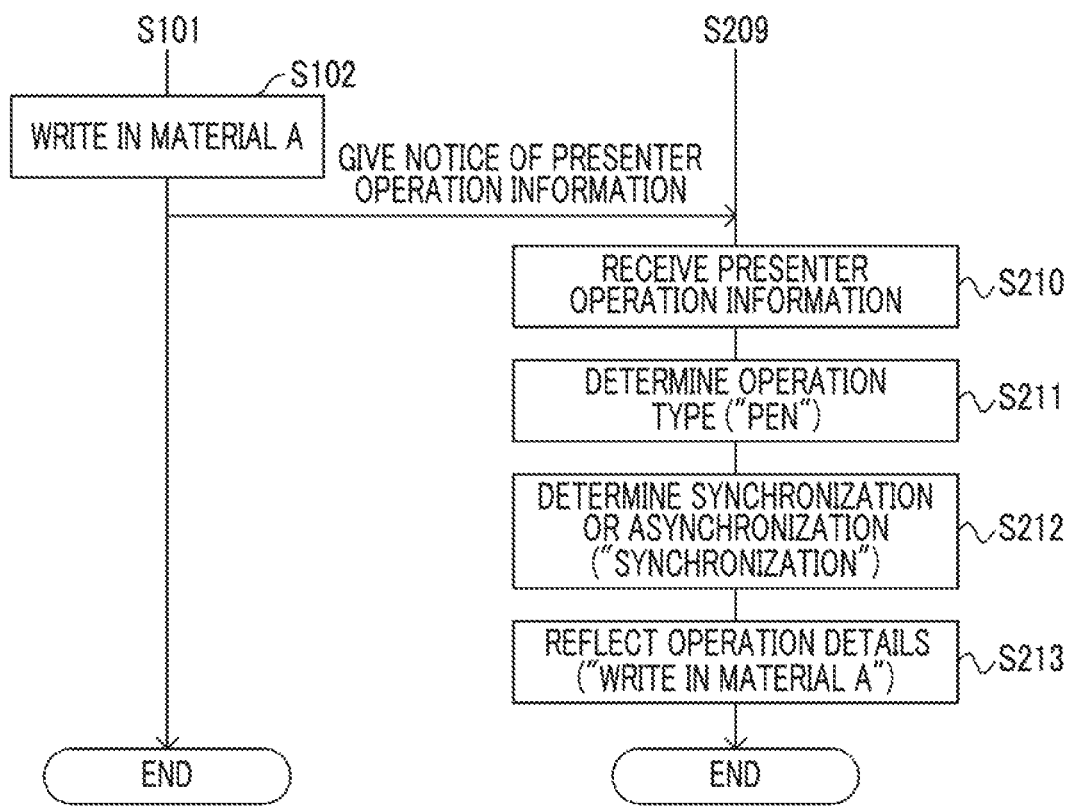
FIG. 8 is a flow chart illustrating the operation of the electronic conference system.

Next, a flow of processing in the electronic conference system 100 will be described. FIGS. 7 and 8 ere flow charts illustrating the operation of the electronic conference system 100. Here, as an example, a description will be given on the assumption that a presenter P performs presentation regarding a material A in an electronic conference using the presenter terminal 10a, a participant S participates in the electronic conference using the participant terminal 10b, and the presenter P and the participant S conduct the electronic conference while performing a desired operation. Meanwhile, the electronic conference system 100 includes one presenter terminal and plural participant terminals which are connected to each other through the communication network 20. However, hereinafter, a description will be given focusing on one presenter terminal 10a and one participant terminal 10b.

First, the presenter P selects a file of the material A which is stored in the storage section 103 (FIG. 2) in the presenter terminal 10a. Thereby, contents of the material A are displayed on the display section 106 of the presenter terminal 10a (S101). For example, a top page (first page) of the material A is displayed. In addition, the presenter terminal 10a notifies the participant terminal 10b of presenter operation information, including information regarding the material A (for example, an ID and a page number of the material A), which indicates details of an operation that the presenter P performs (here, display a new material A).

Next, the presenter operation reception section 11 of the participant terminal 10b receives the presenter operation information from the presenter terminal 10a (S201). Here, the presenter operation reception section 11 receives operation details ("display the new material A") which includes an ID of the material A.

Next, the operation type determination section 13 of the participant terminal 10b determines an operation type based on the presenter operation information (S202). Here, the operation type determination section 13 specifies an operation type ("display material") corresponding to the operation details ("display the new material A") with reference to the operation type table illustrated in FIG. 6.

Next, the synchronization determination section 14 of the participant terminal 10b determines the synchronization or asynchronization of the participant terminal 10b based on a determination result of the operation type determination section 13 (S203). Here, since the "display material" is specified as an operation type, the synchronization determination section 14 determines "synchronization".

Next, the display control section 15 of the participant terminal 10b controls a display content of the display screen in the participant terminal 10b based on a determination result of the synchronization determination section 14 (S204). Here, since the synchronization determination section 14 determines "synchronization", the display control section 15 reads out the material A stored in the multimedia DB 31, and displays the first page of the material A on the display section 106 of the participant terminal 10b.

In the processes of S201 to S204, the presenter terminal 10a and the participant terminal 10b are in a synchronization state (synchronization mode), and thus the same content is displayed.

Subsequently, the participant S performs a desired operation on the participant terminal 10b. Here, it is assumed that the participant S switches the display page (first page) of the material A displayed on the display screen to a second page (S205).

Then, the participant operation acquisition section 12 of the participant terminal 10b acquires participant operation information indicating details of an operation that the participant S perform. Here, the participant terminal 10b acquires participant operation information, including information regarding the material A (for example, an ID of the material A), which indicates details of an operation that the participant S performs (here, switch between pages of the material A) (S206).

Next, the operation type determination section 13 of the participant terminal 10b determines an operation type based on the participant operation information (S207). Here, the operation type determination section 13 specifies an operation type ("switch between pages") corresponding to the operation details ("switch between pages of the material A") with reference to the operation type table illustrated in FIG. 6.

Next, the synchronization determination section 14 of the participant terminal 10b determines the synchronization or asynchronization of the participant terminal 10b based on a determination result of the operation type determination section 13 (S208). Here, since the "switch between pages" is specified as an operation type, the synchronization determination section 14 determines "asynchronization".

Next, the display control section 15 of the participant terminal 10b controls a display screen in the participant terminal 10b based on a determination result of the synchronization determination section 14 (S209). Here, since the synchronization determination section 14 determines the "asynchronization", the display control section 15 changes a display content of the display section 106 of the participant terminal 10b and displays the second page of the material A even when the first page of the material A is displayed on the display section 106 of the presenter terminal 10a.

In the processes of S205 to S209, the participant terminal 10b is in en asynchronization status (asynchronization mode), and thus different contents are displayed on the presenter terminal 10a and the participant terminal 10b.

Subsequently, the presenter P performs a desired operation on the presenter terminal 10a. Here, it is assumed that the presenter P writes a character in the first page of the material A displayed on the display section 106 using a pen tool (S102 in FIG. 8).

Then, the presenter terminal 10a notifies the participant terminal 10b of presenter operation information, including the position (coordinates) of the written character and information indicating an ID and a page number of the written material A, which indicates details of an operation that the presenter P performs (here, writing in the material A using a pen tool).

Next, the presenter operation reception section 11 of the participant terminal 10b receives the presenter operation information from the presenter terminal 10a (S210).

Next, the operation type determination section 13 of the participant terminal 10b determines an operation type based on the presenter operation information (S211). Here, the operation type determination section 13 specifies an operation type ("pen") corresponding to operation details ("write in the material A using a pen tool") with reference to the operation type table illustrated in FIG. 6.

Next, the synchronization determination section 14 of the participant terminal 10b determines the synchronization or asynchronization of the participant terminal 10b based on a determination result of the operation type determination section 13 (S212). Here, since the "pen" is specified as an operation type, the synchronization determination section 14 determines "synchronization".

Next, the display control section 15 of the participant terminal 10b controls a display content of the display screen in the participant terminal 10b based on a determination result of the synchronization determination section 14 (S213). Here, since the synchronization determination section 14 determines the "synchronization", the display control section 15 changes the display content of the display section 106 of the participant terminal 10b to display the first page of the material A in which a character is written.

In the processes of S210 to S213, the participant terminal 10b is in a synchronization state (synchronization mode) again, and thus the same content is displayed on the presenter terminal 10a and the participant terminal 10b.

As described above, in the electronic conference system 100, switching between synchronization and asynchronization is automatically performed in response to desired operations of a presenter and a participant, and a display content of the participant terminal 10b is changed.

Figure 9:
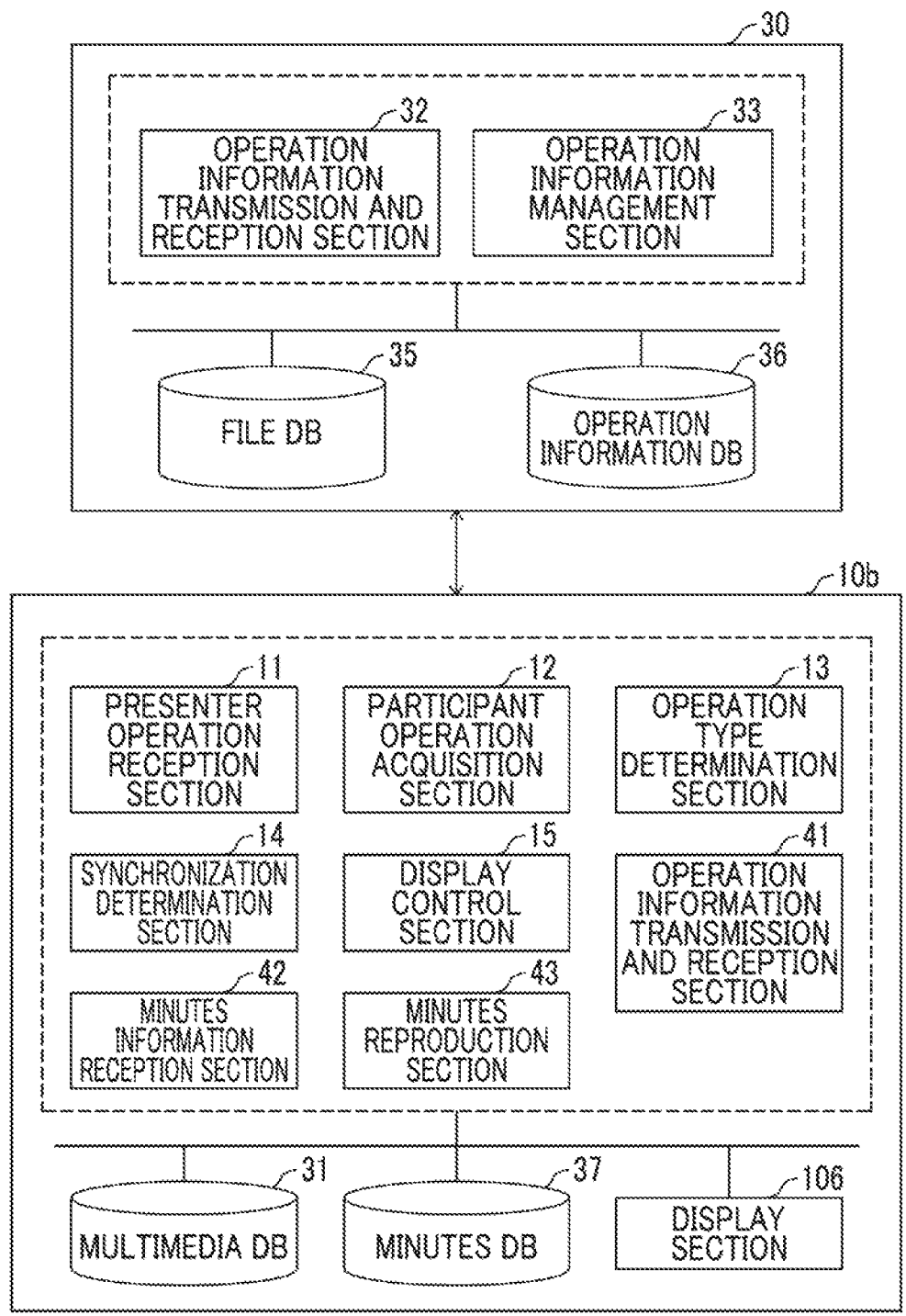
FIG. 9 is a functional block diagram illustrating configurations of a server and the operation terminal.

Next, a method of recording a conference in the electronic conference system 100 will be described. FIG. 9 is a functional block diagram illustrating configurations of the server 30 and the operation terminal 10. In FIG. 9, the participant terminal 10b will be described as an example. In the configuration illustrated in FIG. 3, the participant terminal 10b further includes an operation information transmission and reception section 41, a minutes information reception section 42, and a minutes reproduction section 43. Meanwhile, although not shown in the drawing, the presenter terminal 10a similarly includes an operation information transmission and reception section 41, a minutes information reception section 42, and a minutes reproduction section 43.

The operation terminal 10 associates operation information (presenter operation information and participant operation information) indicating details of operations that users (presenter and participant) perform during a conference with material information indicating a material displayed on the display section 106 of the operation terminal 10, time information indicating an operation time, and terminal information for indentifying operated terminals and transmits to the server 30 the operation information, the material information, the time information and the terminal information For example, the operation information transmission and reception section 41 of the participant terminal 10b associates participant operation information acquired by the participant operation acquisition section 12 with material information (for example, page information), time information, and terminal information, and transmits to the server 30 the participant operation information, the material information, the time information, and the terminal information. The operation information transmission and reception section 41 functions as a material information reception section that receives materiel information indicating information of a material to be displayed, and an operation information reception section that receives operation information indicating details of operations that users perform on the respective plural operation terminals. Similarly, in the presenter terminal 10a, the operation information transmission and reception section associates presenter operation information acquired by the presenter operation acquisition section with material information (for example, page information), time information, and terminal information and transmits to the server 30 the presenter operation information, the material information, the time information, and the terminal information.

The server 30 includes an operation information transmission and reception section 32 and an operation information management section 33. The elements are realized by the CPU 301 executing a program stored in the memory 302 (see FIG. 2). The storage section 303 includes a file DB 35 that stores material data, and an operation information DB 36 that stores pieces of operation information received from the presenter terminal 10a and the participant terminal 10b.

The operation information transmission and reception section 32 receives pieces of operation information transmitted from the presenter terminal 10a and the participant terminal 10b. For example, the operation information transmission and reception section 32 sequentially receives the pieces of operation information transmitted from the operation terminal 10 in time series during a conference.

The operation information management section 33 (information recording section) stores the pieces of operation information received by the operation information transmission and reception section 32 in an operation information management table of the operation information DB 36. FIG. 10 is a diagram illustrating an example of the operation information management table. In the example of FIG. 10, a case where a conference is started at "2015/03/18 10:00:00" is shown. For example, a management number "1" indicates operation information when a presenter switches a page number of a material from a first page to a second page at a time of "2015/03/18 10:00:41" (40 seconds after since the start off a conference) in a presenter terminal of "000001 (master)". For example, a management number "3" indicates operation information when a participant writes in the second page of the material using a pen at a time of "2015/03/16 10:01:15" in a participant terminal of "000005 (slave)". As data items of the operation information management table, information of a material as a target for operation, for example, information indicating a name of a material in which the participant writes using the pen and a location (coordinates) of a material in which the participant writes are registered. In this manner, operation information regarding operations performed by a presenter and a participant during a conference is registered in the operation information management table in association with information regarding a material which is synchronously displayed. Meanwhile, time information may be real time, or may be an elapsed time from a point in time at which a conference is started. However, it is more preferable that the time information includes real time and an elapsed time from a point in time at which a conference is started. The time information includes the real time and the elapsed time, and thus, for example, it is possible to distinguish between a user who participates in the conference later and speaks and a user who participates in the conference from the beginning and to obtain an alteration prevention effect. In addition, according to such a configuration, it is possible to perform reproduction as if all users participated in the conference from the beginning inclusive of the user participating in the conference later during the reproduction of a minutes, and it is also possible to reproduce a minutes only for users participating in the conference from the beginning exclusive of the user participating in the conference later. The operation information management section 33 associates a series of pieces of information (minutes information) recorded in the operation information management table with a material used for a conference.

The operation information transmission and reception section 32 transmits information (minutes information) of the operation information management table which is registered by the operation information management section 33 to the operation terminal 10. For example, the operation information transmission and reception section 32 transmits minutes information illustrated in FIG. 10 in which a series of flows of operations (events) performed during a conference is registered, to the presenter terminal 10a and the participant terminal 10b after the conference is terminated.

The minutes information reception section 42 of the participant terminal 10b receives minutes information transmitted from the server 30 and stores the received information in a minutes DB 37.

The minutes reproduction section 43 reproduces the past minutes in response to a user's operation (reproduction request). Specifically, the minutes reproduction section 43 reads out a material used in a target conference from the multimedia DB 31, and displays the read-out material on the display section 106. Next, the minutes reproduction section 43 reflects a display content according to operation details based on time information of minutes information. For example, when the minutes reproduction section 43 receives an instruction to reproduce a minutes from a user, a first page of a material A is displayed. Thereafter, a second page of the material A is displayed 40 seconds after from the reception of the reproduction instruction (management number "1" in FIG. 10). Next, the minutes reproduction section 43 reproduces sound, data (management number "2" in FIG. 10). Next, the minutes reproduction section 43 draws a character or a figure, which is input using a pen, in a predetermined location (coordinates) in the second page of the material A (management number "3" in FIG. 10). In this manner, the past conference is reproduced.

Meanwhile, when the operation information transmission and reception section 32 of the server 30 receives an instruction to reproduce a minutes from a user, the operation information transmission and reception section may sequentially transmit pieces of minutes information to the user's operation terminal 10 based on time information, and the minutes reproduction section 43 may sequentially reproduce the minutes based on the received pieces of minutes information.

In the conference system 100 according to the exemplary embodiment, information regarding a material used in a conference and information regarding an operation operated by a user are recorded (managed) as different pieces of information rather than as integrated movie information. During the reproduction of the minutes, information regarding an operation operated in the conference is reflected on the material used in the conference based on time information.

According to the above-described configuration, operation information is recorded separately from a material, and thus it is possible to further reduce the amount of data of a minutes than in a case where a conference is recorded as movie information, and to realize the efficient recording of a minutes of the conference.

In addition, in the conference system 100, a user may perform a desired operation during the reproduction of a minutes. Specifically, as shown in the processes of S205 to S209 in FIG. 7, it is possible to reflect operation details different from details of an operation performed in a conference, in an asynchronization mode. For example, when a user switches a second page to a third page in a case where the operation details shown in the management number "3" in FIG. 10 is reproduced, the display control section 15 displays the third page. Thereafter, when a time of "pick up" shown in a management number "4" comes, the minutes reproduction section 43 returns the material to the second page and displays a picked-up comment at a predetermined location. In this manner, the user may perform a desired operation during the reproduction of a minutes similar to an operation during a conference, and thus it is possible to increase the degree of freedom of the user's operation during the reproduction of a minutes.

Here, operation information regarding an operation performed during the reproduction of a minutes may be included in minutes information (FIG. 10). Specifically, for example, when writing using a "pen" is performed in an operation terminal "local" of an operation performed during the reproduction of the minutes, the operation information transmission and reception section 41 of the operation terminal "local" transmits the operation information to the server 30. When the operation information transmission and reception section 32 of the server 30 receives the operation information from the operation terminal "local", the operation information management section 33 of the server 30 records the operation information in the operation information management table of the operation information DB 36. FIG. 11 illustrates an updated operation information management table. In FIG. 11, new operation information (management number "2") is added.

According to the above-described configuration, when a minutes is reproduced after the operation information management table of FIG. 11 is generated, a minutes having the added operation information reflected thereon is reproduced. That is, it is possible to dynamically manage contents of the past conference.

The electronic conference system 100 is not limited to the above-described configuration, and various configurations maybe adopted. Hereinafter, an electronic conference system 100 according to a modification example will be described focusing on differences from the above-described configuration. In the following electronic conference system 100 according to the modification example, elements having functions common to those in the above-described electronic conference system 100 will not be described.

In an electronic conference system 100 according to Modification Example 1, when a participant operation acquisition section 12 acquires participant's operation details (participant operation information), an operation type corresponding to the operation details is not determined, while a display control section 15 may sets a participant terminal 10b to be in an asynchronization state (asynchronization mode) with respect to a presenter terminal 10a and may display a display content according to the operation details on the display section 106 of the participant terminal 10b. In addition, when a presenter operation reception section 11 receives presenter's operation details (presenter operation information), an operation type corresponding to the operation details is determined, and the display control section 15 may set the participant terminal 10b to be in a synchronization state (synchronization mode) with respect to the presenter terminal 10a and may display a display content according to the operation details corresponding to the operation type on the display section 106 of the participant terminal 10b.

According to the electronic conference system 100 of Modification Example 1, a synchronization state is sec only when a certain operation (operation corresponding to an operation type), for example, an operation of changing a display content displayed on the display section 106 of the presenter terminal 10a is performed by a presenter, and thus a display content according to the operation is displayed on the display section 106 of the participant terminal 10b, while the operation is not performed, a display content according to a participant's desired operation is displayed on the display section 106 of the participant terminal 10b.

In an electronic conference system 100 according to Modification Example 2, when a presenter operation reception section 11 receives presenter's operation details (presenter operation information), an operation type corresponding to the operation details is not determined, while a display control section 15 may set a participant terminal 10b to be in a synchronization state (synchronization mode) with respect to a presenter terminal 10a and may display a display content according to the operation details on the display section 106 of the participant terminal 10b. In addition, when the participant operation acquisition section 12 acquires participant's operation details (participant operation information), an operation type corresponding to the operation details is determined, and the display control section 15 may set the participant terminal 10b to be in an asynchronization state (asynchronization mode) with respect to the presenter terminal 10a and may display a display content according to the operation details corresponding to the operation type on the display section 106 of the participant terminal 10b.

According to the electronic conference system 100 of Modification Example 2, an asynchronization state is set only when a participant's certain operation (operation corresponding to an operation type), for example, an operation of changing a display content displayed on the display section 106 of the participant terminal 10b in synchronization with the presenter terminal 10a is performed, and thus a display content according to the operation is displayed on the display section 106 of the participant terminal 10b. While the operation is not performed, a display content according to a presenter's desired operation is displayed on the display section 106 of the participant terminal 10b. Meanwhile, the electronic conference system 100 according to Modification Example 2 may be configured such that transition to a synchronization state is automatically performed at a point in time when a display content according to participant's operation details is displayed on the display section 106 of the participant terminal 10b.

In an electronic conference system 100 according to Modification Example 3, a display content according to a participant's operation details maybe displayed on the display section 106 of the participant terminal 10b while maintaining a synchronization state between a presenter terminal 10a and the participant terminal 10b. For example, when the participant performs switching to a second page of a material A in a case where the presenter terminal 10a and the participant terminal 10b are in a synchronization state and a first page of the material A is displayed on a display screen of each of the terminals, a display control section 15 divides the display screen into a first screen for a synchronization mode and a second screen for an asynchronization mode, the first page is displayed on the first screen in response to a synchronization mode, and the second page is displayed on the second screen in response to an asynchronization mode. In this case, the first screen may be made smaller than the second screen. In addition, the first screen and the second screen may be displayed lined up, or one screen may be displayed within the other screen in an overlapping manner. In addition, in the above-described example, when the participant performs an operation of selecting (clicking) the first screen, the display control section 15 may release the asynchronization mode in the second screen and may switch the first screen to a full-screen display mode.

According to the electronic conference system 100 of Modification Example 3, a participant may display a content according to a desired operation while confirming the same content as a display content of the presenter terminal 10a in the participant terminal 10b.

An electronic conference system 100 according to Modification Example 4 may be configured such that an asynchronization state is maintained based on a participant's instruction when a participant terminal 10b is in an asynchronization state. For example, when the participant selects an asynchronization button on a display screen using a mouse pointer, the participant terminal 10b maintains an asynchronization state. In addition, for example, the electronic conference system may be configured such that the participant terminal 10b maintains an asynchronization state while the participant touches the display screen using his or her finger.

In addition, the electronic conference system 100 according to Modification Example 4 may be configured such that when presenter's operation details corresponds to an operation type regarding a certain operation among plural operation types in a case where an asynchronization state is maintained, the asynchronization state is forcibly released and transitions to a synchronization state. The wording "certain operation" as used herein refers to, for example, displaying a new material, writing in a material, or the like.

Figure 12:
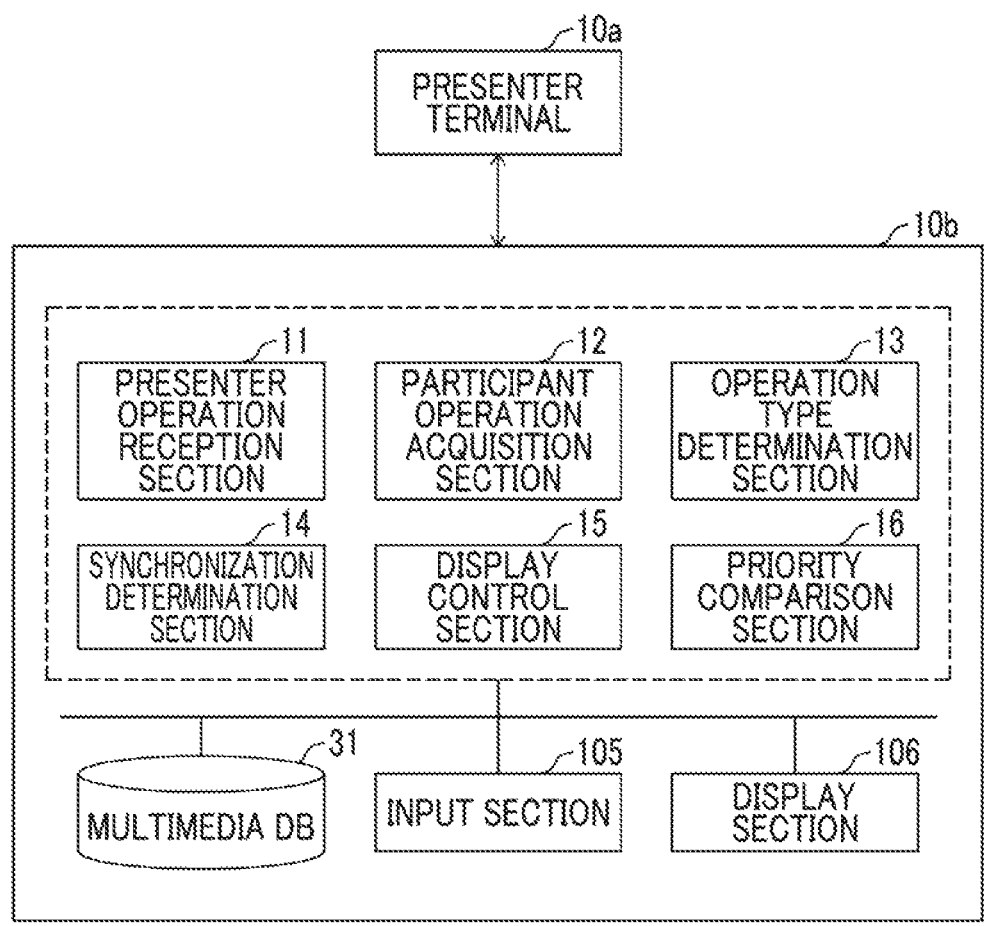
FIG. 12 is a functional block diagram illustrating a specific configuration of a participant terminal in an electronic conference system according to Modification Example 5.

FIG. 12 is a functional block diagram illustrating a specific configuration of a participant terminal 10b in an electronic conference system 100 according to Modification Example 5. In the electronic conference system 100 according to Modification Example 5, the participant terminal 10b further includes a priority comparison section 16 that acquires the priority (presenter priority) of an operation type corresponding to presenter operation information and the priority (participant priority) of an operation type corresponding to participant operation information and compares the priorities with each other. The priority indicates the importance of operation details in the presenter or the participant. For example, as illustrated in FIG. 13, "display material" has the highest priority, and the priority gets lower in the order of "pen", "pick up", "switch between pages", and "pointer". The priority is set in advance in an operation type table illustrated in FIG. 13. Meanwhile, the presenter priority and the participant priority maybe the same as each other as illustrated in FIG. 13, or may be different from each other as illustrated in FIG. 14.

When a period of time for which presenter operation information is received by a presenter operation reception section 11 and a period of time for which participant operation information is acquired by a participant operation acquisition section 12 overlap each other, the priority comparison section 16 compares the priorities thereof with each other.

FIG. 15 is a flow chart illustrating the operation of the electronic conference system 100 according to Modification Example 5. First, in the participant terminal 10b, a presenter operation reception section 11 receives presenter operation information from a presenter terminal 10a (S11), and a participant operation acquisition section 12 acquires participant operation information (S12). Next, an operation type determination section 13 specifies an operation type corresponding to each of the presenter operation information and the participant operation information (S13). Next, a priority comparison section 16 acquires priorities (presenter priority, participant priority) corresponding to the respective operation types (S14), and determines whether the presenter priority is higher than the participant priority (S15). When the presenter priority is higher than the participant priority (YES in S15), the display control section 15 displays a display content according to presenter's operation details on a display screen of the participant terminal 10b (S16). On the other hand, when the participant priority is higher than the presenter priority (NO in S15), the display control section 15 displays a display content according to participant's operation details on the display screen of the participant terminal 10b (S17). After the processes of S16 and S17 are performed, the processes are repeated until an electronic conference is terminated (S18).

In this manner, in the electronic conference system 100 according to Modification Example 5, the display control section 15 displays a display content according to operation information corresponding to an operation type of operation information having a higher priority out of presenter operation information and participant operation information, on the display screen (display section 106) of the participant terminal 10b. For example, when a participant switches a page of a material screen (see FIG. 5) displayed on the display section 106 of the participant terminal 10b in a case where a presenter moves a mouse pointer on a material screen (see FIG. 5) displayed on the display section 106 of the presenter terminal 10a, the participant priority ("2") is higher than the presenter priority ("1"), and thus the display control section 15 reflects "switch between pages" on the participant terminal 10b without reflecting "move mouse pointer" on the participant terminal 10b.

The electronic conference system 100 according to Modification Example 5 is not limited to the above-described configuration. For example, the priority comparison section 16 may compare the presenter priority with a predetermined priority which is set in advance. The display control section 15 may be configured not to reflect a display content according to presenter operation information corresponding to the presenter priority on the participant terminal 10b when the presenter priority is equal to or less than the predetermined priority.

In addition, the electronic conference system 100 according to Modification Example 5 may be configured not to receive a display content according to another operation information while a display content according to operation information having a high priority is displayed on the display section 106 of the participant terminal 10b and may be configured to permit the reception of a display content according to another operation information after a display content according to operation information having a high priority is displayed on the display section 106 of the participant terminal 10b. For example, the electronic conference system may be configured not to receive presenter's operation details (for example, display a new material) while writing in a material using a pen tool is performed in the participant terminal 10b (asynchronization state), and may be configured to display a new material on the display section 106 of the participant terminal 10b at a time when a presenter's writing in a material is terminated.

Figure 16:
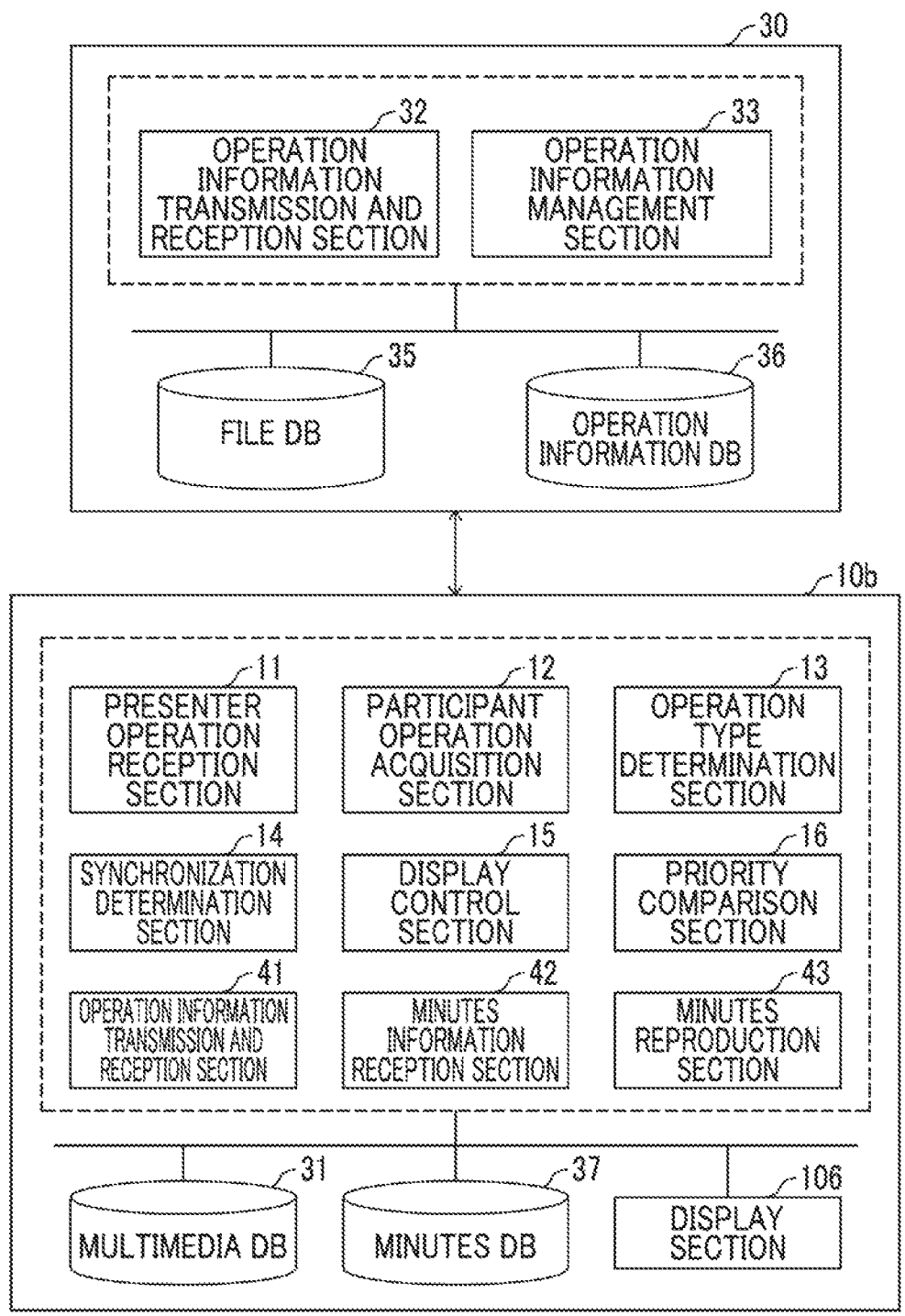
FIG. 16 is a functional block diagram illustrating configurations of a server and an operation terminal.

The information regarding priority may also be used during the reproduction of a minutes. FIG. 16 is a functional block diagram illustrating configurations of a server 30 and an operation terminal 10. A participant terminal 10b further includes an operation information transmission and reception section 41, a minutes information reception section 42, and a minutes reproduction section 43 in the configuration illustrated in FIG. 9. For example, during the reproduction of the past minutes in response to a user's operation (reproduction request), when the user performs an operation of switching between pages in a case where writing in a material using a "pen" is attempted to be reproduced or is being reproduced (management number "3" in FIG. 10), the priority of "pen" is higher than that of "switch between pages", and thus the minutes reproduction section 43 reproduces writing in a material using "pen" without reflecting the operation of "switch between pages". In addition, during the reproduction of a minutes, when a user performs an operation of displaying a new material in a case where picking up a comment using "pick up" is attempted to be reproduced or is being reproduced (management number "4" in FIG. 10), the priority of "display material" is higher than that of "pick up", end thus the minutes reproduction section 43 reflects an operation of "display material" and executes an operation different from contents of a minutes.

Meanwhile, the information regarding priority may be used only during a minutes without being used during a conference. In this case, the minutes reproduction section 43 reproduces operation information having a higher priority in plural pieces of operation information of which the operation times overlap each other, among pieces of operation information received by an operation information transmission and reception section 32 of the server 30, in this case, the priority comparison section 16 determines the priority of operation information based on, for example, a priority determination table illustrated in FIG. 17. In the priority determination table shown in the drawing, priority is set in accordance with the type of terminal (presenter terminal "master", participant terminal "slave", "local terminal") which is subjected to an operation, and an operation type. Meanwhile, as illustrated in FIG. 18, an operation type in the current terminal which is used by a user having instructed a reproduction request may be included in a priority determination table.

In an electronic conference system 100 according to Modification Example 6, a participant operation acquisition section 12 may acquire participant operation information from a participant terminal 10b which is a local terminal or may acquire operation information for a participant from other participant terminals 10c and 10d. That is, the participant operation acquisition section 12 may be configured to also acquire operation information from terminals other than a local terminal. In the above-described configuration, for example, when operation details in operation information for a participant which is received from the participant terminal 10c corresponds to a predetermined operation type, the operation details may be reflected on the participant terminal 10b. According to the above-described configuration, for example, when a comment is contributed in the participant terminal 10c, the contributed comment is displayed on the display section 106 of the participant terminal 10b.

Incidentally, in the electronic conference systems 100 according to the above-described exemplary embodiments, a synchronization determination section 14 may be omitted. An electronic conference system 100 not including a synchronization determination section 14 will be described below as Modification Example 7.

In en electronic conference system 100 according to Modification Example 7, a display control section 15 may control a display content to be displayed on a display screen of a participant terminal 10b based on a determination result of an operation type determination section 13. Specifically, when presenter's operation details corresponds to a predetermined operation type (see FIG. 6), the display control section 15 may reflect and display a display content according to the operation details on the participant terminal 10b.

For example, when presenter's operation details (for example, displaying a mouse pointer or writing using a pen tool) is reflected on the participant terminal 10b and participant's operation details are displaying a mouse pointer or writing using a pen tool (within the same page), the participant's operation details may also be reflected on the participant terminal 10b. In other words, both the presenter's operation details and the participant's operation details may be reflected on the participant terminal 10b. Accordingly, it is possible to set an intermediate stare (semi-synchronization state) between a synchronization state and an asynchronization state, in which the presenter's operation details and the participant's operation details are simultaneously reflected, in this manner, the display control section 15 may realize a semi-synchronization mode regardless of a synchronization mode and an asynchronization mode. That is, the display control section 15 may also change a display content displayed on the display section 106 of the participant terminal 10b to a display content according to both presenter's operation details and participant's operation details.

When the electronic conference system 100 includes a synchronization determination section 14, it is also possible to configure a system shown in the following Modification Example 8 using, for example, a determination result of the synchronization determination section 14.

Figure 19:
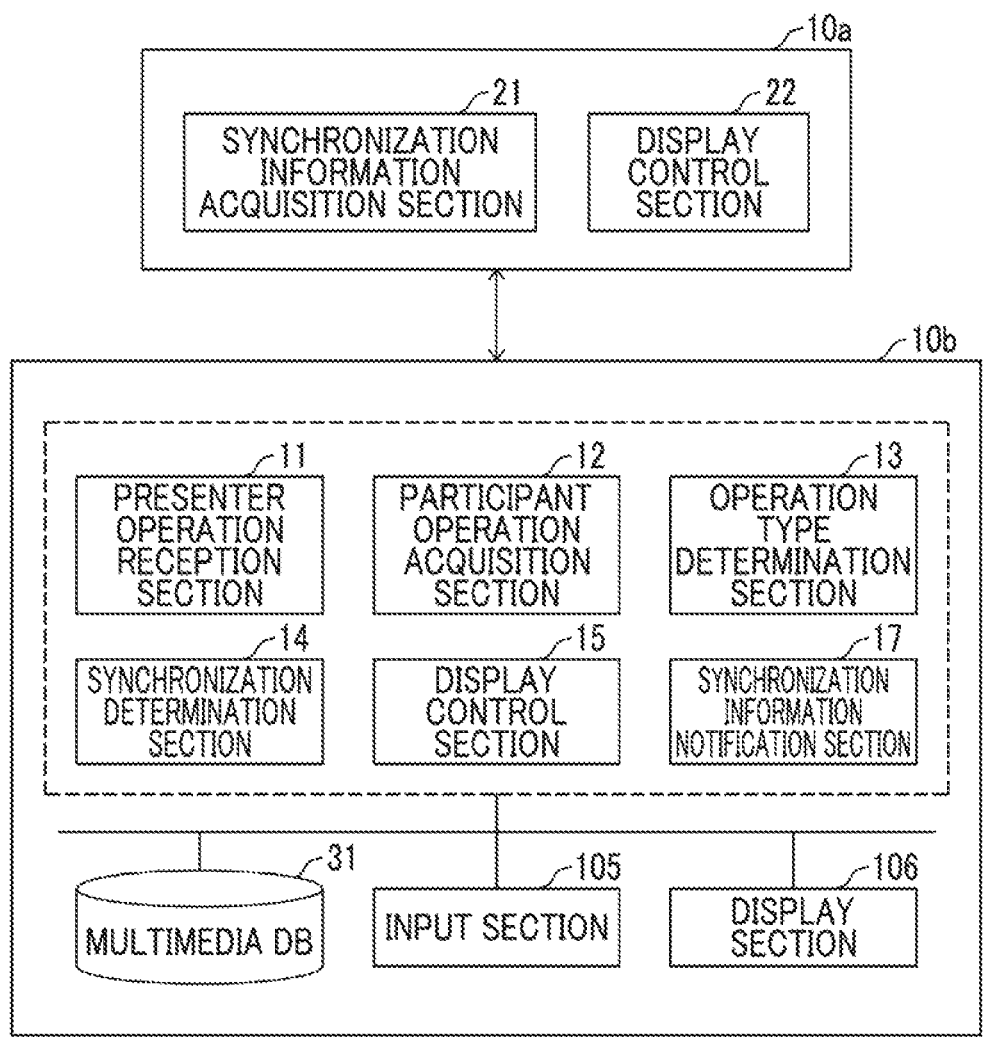
FIG. 19 is a functional block diagram illustrating a specific configuration of an electronic conference system according to Modification Example 8.

FIG. 19 is a functional block diagram illustrating a specific configuration of an electronic conference system 100 according to Modification Example 8. In the electronic conference system 100 according to Modification Example 8, a participant terminal 10b further includes a synchronization information notification section 17, and a presenter terminal 10a further includes a synchronization information acquisition section 21 and a display control section 22.

The synchronization information notification section 17 of the participant terminal 10b transmits, to the presenter terminal 10a, synchronization information indicating whether the participant terminal 10b is synchronized with the presenter terminal 10a, and synchronization information including a display content of a display screen in a case of non-synchronization, and the like.

The synchronization information acquisition section 21 of the presenter terminal 10a acquires the synchronization information from the participant terminal 10b. Meanwhile, the synchronization information acquisition section 21 acquires the synchronization information from all participant terminals included in the electronic conference system 100.

The display control section 22 of the presenter terminal 10a controls a display content of a display screen of the presenter terminal 10a based on the synchronization information acquired by the synchronization information acquisition section 21. For example, the display control section 22 calculates a total number of participant terminals (number of synchronizations) in a synchronization state among all participant terminals, and displays the number of synchronizations on the display screen of the presenter terminal 10a. In addition, the display control section 22 may calculate a ratio of the number of participant terminals in a synchronization state with respect to a total number of participant terminals (synchronization ratio), and may displays the synchronization ratio on the display screen of the presenter terminal 10a. In addition, the display control section 22 may display a display content displayed on the display screen of the participant terminal 10b in an asynchronization state so as to be lined up on the display screen of the presenter terminal 10a (for example, thumbnail display).

Figure 20:
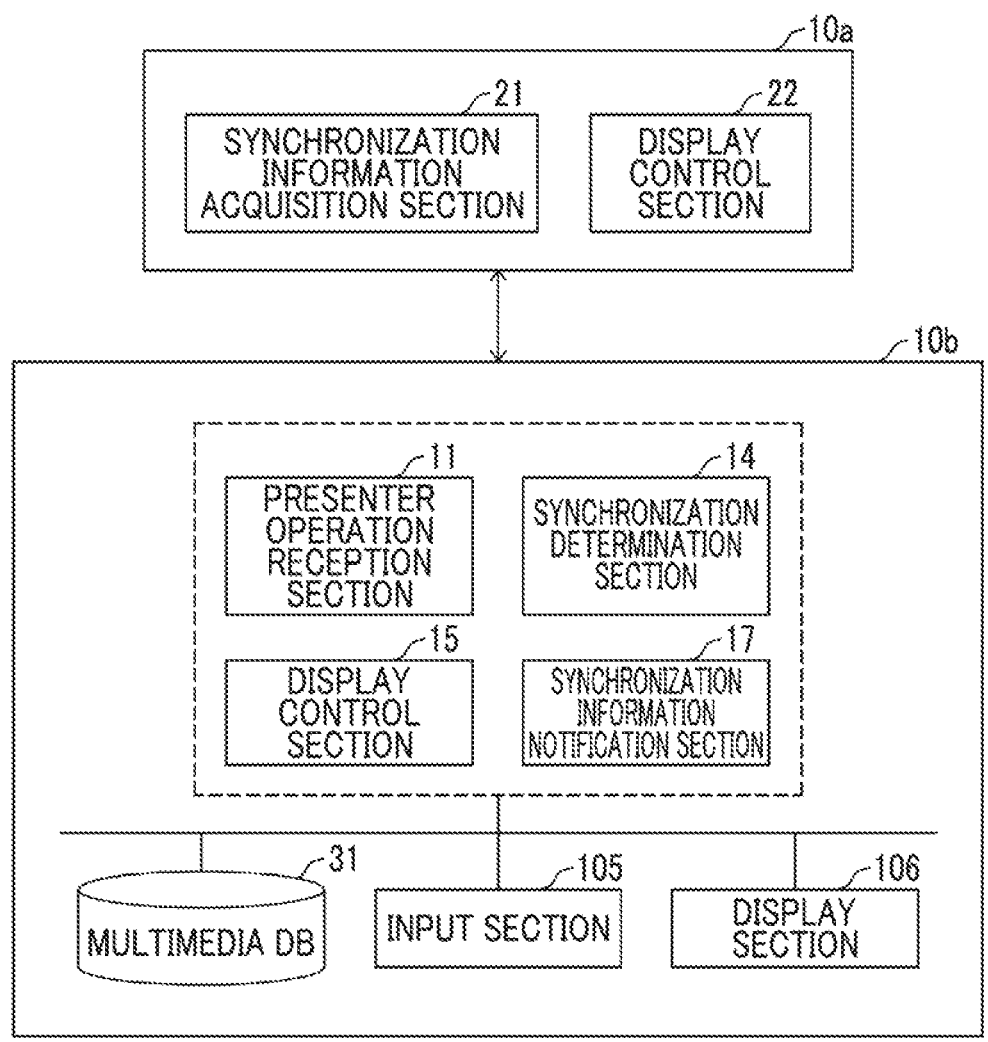
FIG. 20 is a functional block diagram illustrating a specific configuration of the electronic conference system according to Modification Example 9.

An electronic conference system 100 according to Modification Example 9 is configured such that a participant operation acquisition section 12 and an operation type determination section 13 of a participant terminal 10b are omitted in the configuration of the electronic conference system 100 according to Modification Example 8. FIG. 20 is a functional block diagram illustrating a specific configuration of the electronic conference system 100 according to Modification Example 9. A configuration of a presenter terminal 10a is the same as the configuration illustrated in FIG. 19. As the participant terminal 10b, a well-known operation terminal performing synchronization display may be used. According to the above-described configuration, a synchronization ratio and a display content of the participant terminal 10b in an asynchronization state are displayed on a display screen of the presenter terminal 10a, similar to the Modification Example 8. Accordingly, a presenter may ascertain the degree of a participant's interest in presentation contents of the presenter himself or herself.

Meanwhile, a program for realizing the electronic conference system 100 according to Modification Example 9 described above is a program capable of displaying at least a portion of a display content of the presenter terminal 10a (second operation terminal) on at least a portion of a display screen of the participant terminal 10b (first operation terminal) so as to be in a synchronization state in plural operation terminals, and may be configured as a program causing a computer to function as a display control section that displays a ratio of the number of participant terminals 10b in a synchronization state with respect to a total number of participant terminals 10b (synchronization ratio) on the display screen of the presenter terminal 10a. In addition, the display control section may display a display content of the participant terminal 10b in an asynchronization state on the display screen of the presenter terminal 10a.

Figure 21:
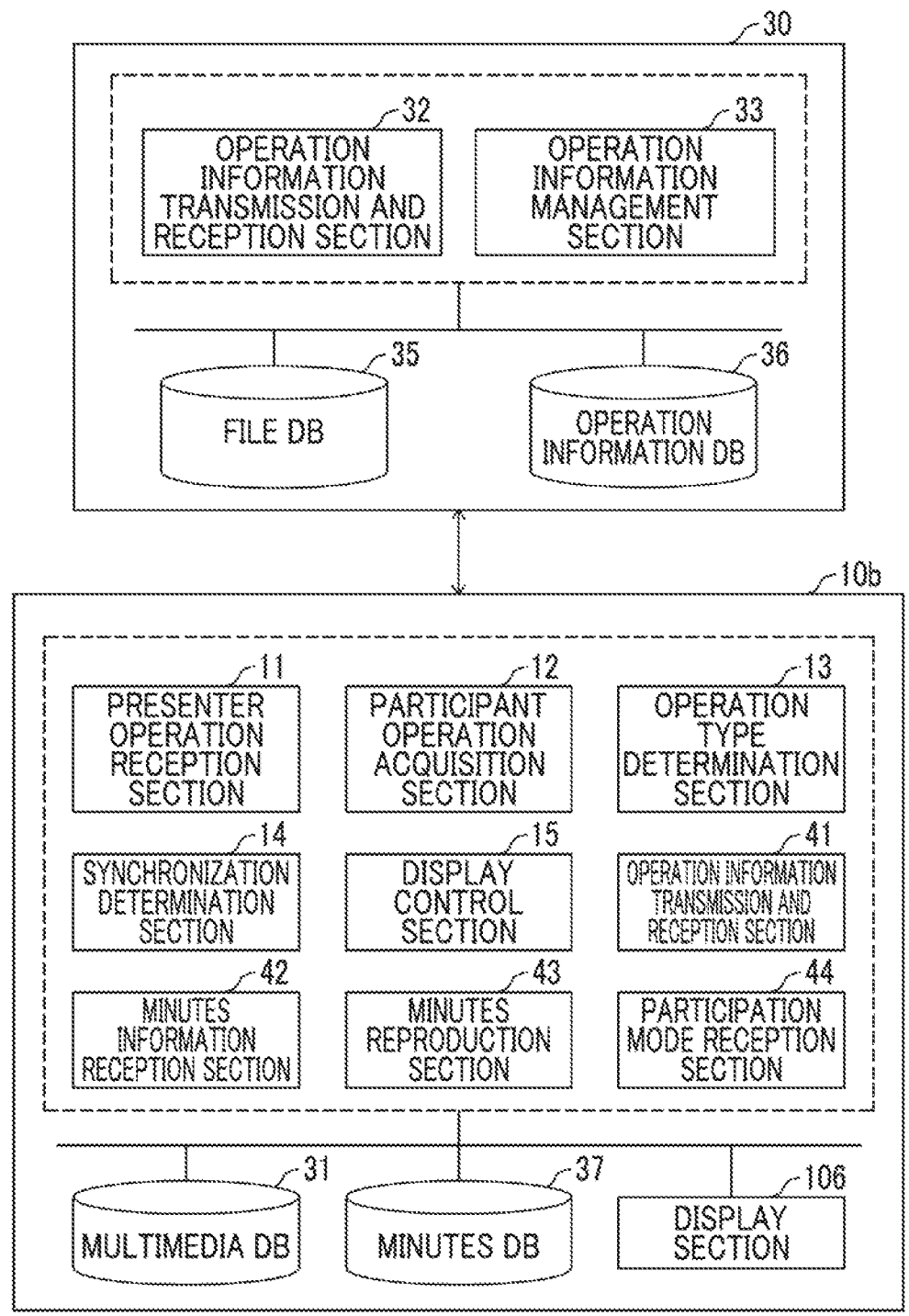
FIG. 21 is a functional block diagram illustrating a specific configuration of an electronic conference system according to Modification Example 10.

FIG. 21 is a functional block diagram illustrating a specific configuration of art electronic conference system 100 according to Modification Example 10. In the electronic conference system 100 according to Modification Example 10, a participant terminal 10b further includes a participation mode reception section 44 in the configuration illustrated in FIG. 9.

The participation mode reception section 44 receives a participation mode selected by a participant who participates in a conference. Specifically, when the participant participates in the conference from the middle of the conference, the participant selects any one of a first participation mode in which the participant participates in a conference proceeding in real time from a point in time of participation end a second participation mode in which the participant participates in the real-time conference after a minutes until catching up with the progress of the real-time conference from the start of the conference is reproduced at a high speed. When the participant selects the first participation mode, synchronization display and the like are performed in real time from the point in time of participation. When the participant selects the second participation mode, a minutes reproduction section 43 reproduces the minutes until catching up with the progress of the real-time conference from the start of the conference at a high speed. In a case of catching up with the progress of the real-time conference, synchronization display and the like are performed in real time.

The elements of the electronic conference systems 100 according to the exemplary embodiments and modification examples described above may be realized by a CPU executing a program in an information processing apparatus connected to the operation terminals 10 (presenter terminal 10a and participant terminals 10b, 10c, and 10d) through a network. The information processing apparatus may be configured as, for example, the server 30 illustrated in FIG. 4. In this case, in the information processing apparatus, the participant operation acquisition section 12 acquires participant operation information from the participant terminals, the operation type determination section 13 specifies operation types corresponding to the respective participant terminals, and the synchronization determination section 14 determines synchronization or asynchronization corresponding to each participant terminal. In addition, the display control section 15 controls a display content of a display screen of each participant terminal based on a determination result of the synchronization determination section 14.

In addition, the exemplary embodiments and the modification examples are examples, and the exemplary embodiments and the modification examples may also be combined with each other.

Figure 22:
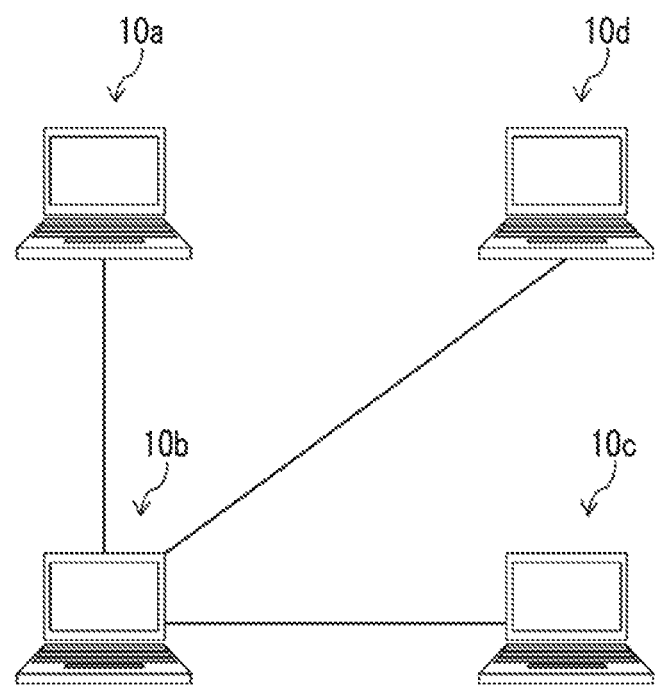
FIG. 22 is a diagram illustrating en ex ample of a network configuration of an electronic conference system.
Figure 23:
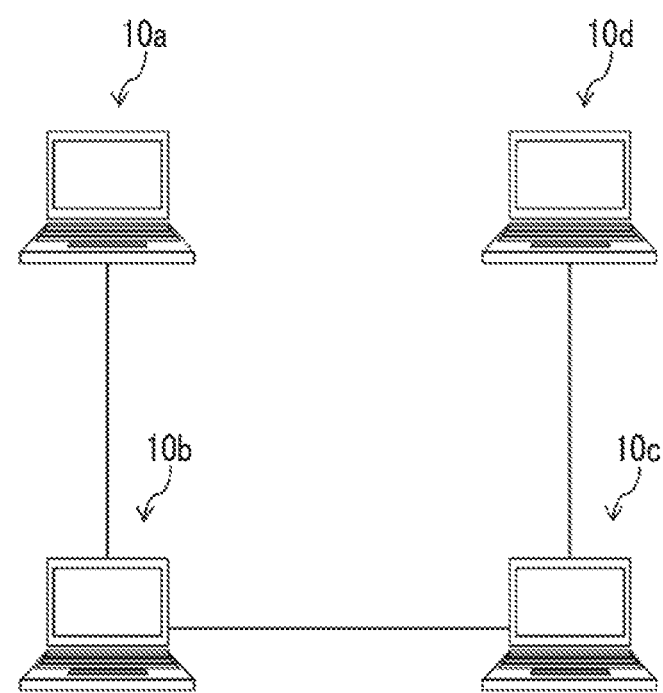
FIG. 23 is a diagram illustrating an example of a network configuration of an electronic conference system.

In addition, a network configuration of the electronic conference system 100 is not limited to the configuration illustrated in FIG. 4. For example, as illustrated in FIG. 22, the operation terminals 10 maybe configured to be connected to each other through the participant terminal 10b (star shape) In addition, as illustrated in FIG. 23, a configuration (peer to peer (P2P)) may be adopted in which the participant terminals 10b, 10c, and 10d are connected to each other with the presenter terminal 10a as a starting point.

In addition, in the network configuration illustrated in FIG. 4, the operation terminals 10 may be connected to the server 30 by a user designating starting up a web browser and designating a common URL (server), or an application program started up by each of the operation terminals 10 may be automatically connected to the server 30 in accordance with an address which is set in advance. In addition, the operation terminals 10 and the server 30 may be connected to each other by a Web Socket, or the operation terminals 10 may exchange information with each other between the operation terminals 10 in a pseudo manner by connecting with the server 30 at fixed intervals (polling).

Meanwhile, regarding mutual transition (switching) between a synchronization state and an asynchronization state in the electronic conference system 100, when the initial setting (default) of the operation terminal 10 is an asynchronization state, the asynchronization state is released and transitions to a synchronization state. When the initial state is a synchronization state, the synchronization state is released and transitions to an asynchronization state.

In the above description, an electronic conference system has been described as an example of an information processing system. However, the information processing system is not limited to the electronic conference system, and includes various systems that share electronic data between operation terminals connected to each other through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated, it is intended that the scope of the invention be defined by the following claims and their equivalents.

What is claimed is:

1. A non-transitory computer readable medium storing a program causing a computer to execute a process for causing at least portions of display screens of a plurality of terminals connected to each other through a network to display information in a synchronous manner, the process comprising:

receiving material information indicating information regarding a material to be displayed;

receiving operation information indicating details of operations that at least one presenter and at least one participant perform on the respective terminals;

comparing priorities of the operation information with each other based on types of the operation information, the comparison based upon a predetermined ordering of types of operation information, the priorities including priorities of the at least one presenter and the at least one participant, the comparing of priorities comparing the priorities of the at least one presenter and the priorities of the at least one participant; and recording minutes information in which the material information, the operation information, and time information indicating times at which the users perform the operations are associated with each other, the operation information and material information being recorded as different pieces of information rather than as integrated information;

wherein the recording records operation information having a high priority among the plural pieces of operation information, in association with the material information and the time information, and wherein when a period of time for which operation information of the at least one presenter is received and a period of time for which operation information of the at least one participant is acquired overlap each other, the comparing of priorities of the operation information occurs.

2. The non-transitory computer readable medium according to claim 1, further comprising:
associating the minutes information with data of the material which is stored in a storage section.

3. The non-transitory computer readable medium according to claim 1, further comprising:
reproducing the minutes information based on a user's request,
wherein the reproducing comprises
reading the material from a storage section that stores data of the material,
displaying the read material on at least portions of display screens of a terminal through which the request is made, and
reflecting, to the displayed material, the details of the operations corresponding to the operation information based on the minutes information.

4. The non-transitory computer readable medium according to claim 3, wherein the recording further comprises adding to the minutes information another operation information indicating details of an operation that is performed on the terminal, through which the request is made, when the minutes information is being reproduced.

5. The non-transitory computer readable medium according to claim 3, wherein the reproducing further comprises, when the user's request is made during the recording of the minutes information, making a reproduction speed of the minutes information to be higher than a normal speed.

6. The non-transitory computer readable medium according to claim 3, further comprising:
comparing priorities of the operation information with each other based on types of the operation information,
wherein the reflecting in the reproducing reflects, to the displayed material, details of an operation corresponding to operation information having a high priority among the plural pieces of operation information, based on the minutes information.

7. An information processing apparatus that causes at least portions of display screens of a plurality of terminals connected to each other through a network to display information in a synchronous manner, the information processing apparatus comprising:
a material information reception section that receives material information indicating information regarding a material to be displayed;
an operation information reception section that receives operation information indicating details of operations that at least one presenter and at least one participant perform on the respective terminals;
a priority comparing section that compares priorities of the operation information with each other based on types of the operation information, the comparison based upon a predetermined ordering of types of operation information, the priorities including priorities of the at least one presenter and the at least one participant, the comparing of priorities comparing the priorities of the at least one presenter and the priorities of the at least one participant; and
an information recording section that records minutes information in which the material information, the operation information, and time information indicating times at which the users perform the operations are associated with each other, the operation information and material information being recorded as different pieces of information rather than as integrated information, wherein the information recording section records operation information having a high priority among the plural pieces of operation information, in association with the material information and the time information,
wherein when a period of time for which operation information of the at least one presenter is received and a period of time for which operation information of the at least one participant is acquired overlap each other, the priority comparing section compares the priorities of the operation information with each other.

8. An information processing system that causes at least portions of display screens of a plurality of terminals connected to each other through a network to display information in a synchronous manner, the information processing apparatus comprising:
a material information reception section that receives material information indicating information regarding a material to be displayed;
an operation information reception section that receives operation information indicating details of operations that at least one presenter and at least one participant perform on the respective terminals;
a priority comparing section that compares priorities of the operation information with each other based on types of the operation information, the comparison based upon a predetermined ordering of types of operation information, the priorities including priorities of the at least one presenter and the at least one participant, the comparing of priorities comparing the priorities of the at least one presenter and the priorities of the at least one participant and
an information recording section that records minutes information in which the material information, the operation information, and time information indicating times at which the users perform the operations are associated with each other, the operation information and material information being recorded as different pieces of information rather than as integrated information, wherein the information recording section records operation information having a high priority among the plural pieces of operation information, in association with the material information and the time information, wherein when a period of time for which operation information of the at least one presenter is received and a period of time for which operation information of the at least one participant is acquired overlap each other, the priority comparing section compares the priorities of the operation information with each other.

9. The non-transitory computer readable medium according to claim 1, the process further comprising determining whether an operation mode is synchronous or asynchronous, and when determined to be in an asynchronous mode, recording minutes of operation details different from details of an operation performed in a conference.

10. The non-transitory computer readable medium according to claim 1, wherein the operation information includes operation information from the at least one presenter, the operation information being at least one of displaying a new material, writing in a material using a handwriting tool, selecting a submitted comment, switching pages of a material, inputting and moving a mouse pointer, and inputting sound and the material information.

* * * * *